(12) United States Patent  (10) Patent No.: US 7,815,144 B2
Molnar et al.  (45) Date of Patent: Oct. 19, 2010

(54) GROUND AIR WATER CRAFT

(76) Inventors: Dezso Molnar, 2505 Bowmont Dr., Beverly Hills, CA (US) 90210; Craig Calfee, 194 Seascape Ridge, La Selva Beach, CA (US) 95076; Zoltan Garamszegi, 1335 N. La Brea, #2185, Hollywood, CA (US) 90028

( * ) Notice: Subject to any disclaimer, the term of this patent is extended or adjusted under 35 U.S.C. 154(b) by 142 days.

(21) Appl. No.: 11/667,366

(22) PCT Filed: Feb. 27, 2006

(86) PCT No.: PCT/US2006/007009

§ 371 (c)(1),
(2), (4) Date: May 9, 2007

(87) PCT Pub. No.: WO2007/024267

PCT Pub. Date: Mar. 1, 2007

(65) Prior Publication Data

US 2008/0251308 A1    Oct. 16, 2008

(51) Int. Cl.
*B64C 27/02* (2006.01)
(52) U.S. Cl. .............................. 244/17.11; 244/8; 244/2
(58) Field of Classification Search ............ 244/8, 244/7 R, 2, 49, 50, 53 R, 60, 53 A, 17.11, 244/17.19, 17.21
See application file for complete search history.

(56) References Cited

U.S. PATENT DOCUMENTS

| | | | | |
|---|---|---|---|---|
| 1,262,660 A | * | 4/1918 | Gallaudet | 244/67 |
| 1,578,740 A | * | 3/1926 | Kurelic | 244/50 |
| 2,172,126 A | * | 9/1939 | Lansing | 74/423 |
| 3,149,802 A | * | 9/1964 | Wigal | 244/17.11 |
| 3,273,655 A | * | 9/1966 | Girard | 416/112 |
| 3,870,251 A | * | 3/1975 | Breuner | 244/17.21 |
| 3,937,291 A | * | 2/1976 | Hanagan | 180/220 |
| 4,579,301 A | * | 4/1986 | Brand | 244/119 |
| 4,828,203 A | * | 5/1989 | Clifton et al. | 244/12.3 |
| 4,899,954 A | * | 2/1990 | Pruszenski, Jr. | 244/2 |
| 5,203,520 A | * | 4/1993 | Przygodzki et al. | 244/2 |

(Continued)

*Primary Examiner*—Michael R Mansen
*Assistant Examiner*—Brian M O'Hara
(74) *Attorney, Agent, or Firm*—Arthur M. Dula; Law Office of Art Dula

(57) ABSTRACT

A vehicle that can operate as either a motorcycle or an autogiro, said vehicle having a flight mode and a motorcycle mode, said vehicle comprising:
  a frame having a front part and a rear part;
  a center-line that passes from the front of said vehicle to the rear of said vehicle through the center of said vehicle such that said vehicle's weight is distributed nearly equally to either side of said center-line;
  a propeller mounted to a propeller barrel that is rotatably mounted to said frame such that the junction where said frame's front part meets said frame's rear part is located within said propeller barrel;
  an engine mounted to the rear part of said frame, wherein said engine powers said propeller in said flight mode;
  a cockpit fixedly mounted to the front part of said frame, said cockpit comprising means for controlling said vehicle;
  at least one aircraft lift means comprising: at least one rotor that is rotatably mounted to said frame when said vehicle is in said flight mode;
  a front wheel steerably and rotatably mounted to the front part of said frame along the said vehicle's center-line; and
  a rear wheel that is rotatably mounted to the rear part of said frame along said vehicle's center-line and is powered by said engine in said motorcycle mode.

12 Claims, 27 Drawing Sheets

U.S. PATENT DOCUMENTS

| | | | |
|---|---|---|---|
| 6,086,014 A * | 7/2000 | Bragg, Jr. | 244/2 |
| 6,786,450 B1 * | 9/2004 | Einstein | 244/2 |
| 6,877,690 B1 * | 4/2005 | Bragg | 244/2 |
| 6,978,969 B1 * | 12/2005 | Neal | 244/23 B |
| 7,178,757 B1 * | 2/2007 | Breese et al. | 244/8 |
| 7,182,290 B2 * | 2/2007 | Sliwa et al. | 244/53 A |

* cited by examiner

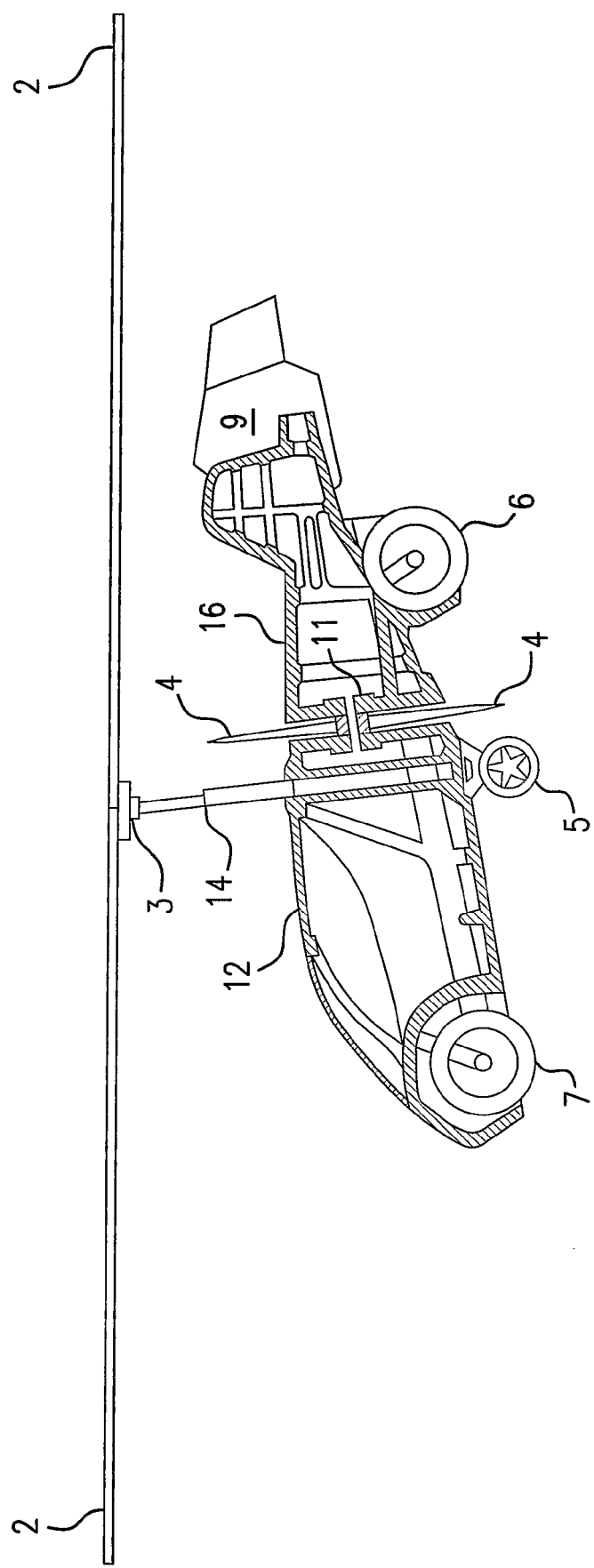

GROUND AIR WATER CRAFT

BACKGROUND

1. Field of the Invention

The invention generally relates to vehicles, more specifically the present invention relates to powered vehicles that can drive on land, fly in the air and move on the surface of water; most specifically the present invention is an autogiro that can operate as a motorcycle on land and can also operate as an aircraft.

2. Description of the Related Art

Since the invention of the airplane, people have sought to make practical vehicles that can travel both through the air and on the earth's surface. Among the earliest attempts at such vehicles were roadable gyroplanes. Roadable gyroplanes have long been driven on three or more wheels on land. The present inventor is unaware of any roadable gyroplane meant to be driven on two wheels. The "Pitcairn AC35", built in the 1930's, is an early design of a three wheel roadable tractor style gyroplane in which the propeller is at the front of the aircraft with the cabin behind the propeller and an engine behind the cabin. A long drive shaft connects the engine to the propeller. The AC35 has conventional landing gear and rear wheel drive. The AC35 is steered by the rear wheel, which results in poor handling characteristics and makes the vehicle difficult to drive. The AC35 has a nose-high conventional landing gear configuration because the propeller blades require a high nose angle when the tail wheel is on the ground to provide propeller clearance after rotation. That high nose angle makes it very difficult to see out of the front during ground operations. Traditionally, pilots taxiing such craft make wide swings to the right and left to look out the side windows. More recent three-wheel roadable gyroplanes employ a pusher configuration, where the propeller is behind the engine and the cabin is in front. Examples include the Super Sky Cycle and the Super Sky Car from New Horizon Components and a Magni gyroplane converted by Sean Cooper to be legally drivable on the road. U.S. Pat. No. 6,978,969 to Larry R. Neal discloses a fly-drive vehicle including a transmission for selectively transferring mechanical power from the motor to one of the of wheels or to the drive propeller, and a landing gear assembly for raising and lowering the pair of wheels, and a folding rotor shaft assembly for raising and lowering the rotor.

Floating gyroplanes that use the thrust of the flight propeller to taxi on water are also possible, such as those built by James Leszie.

Volante Aircraft is currently developing a roadable airplane, consisting of a flight section that is removable from the car component, and that is transportable by the car in trailer fashion. At flight time, the flight section is re-attached to the automobile.

U.S. Pat. No. 6,106,054 discloses a motorcycle enclosed in a monocoque fairing, an embodiment of which is known as the Peraves Ecomobile that uses retractable stabilizer wheels to keep the vehicle upright at low speeds. Though Ragallo wings (U.S. Pat. No. 4,068,810) have been attached to motorcycles and powered parachutes have been attached to motorcycles (U.S. Pat. No. 6,877,690), the present inventor is not aware of any motorcycle in the prior art (whether enclosed in a monocoque fairing or not) that is capable of flight as an autogiro.

U.S. Pat. No. 3,870,251 discloses an autogiro designed by Gerald Breuner (the Breuner Autogiro) with the cabin in front of the propeller and the engine in the rear. The cabin and the engine are connected by struts to an annular duct in which the propeller is located. The present inventor is not aware of any autogiro in this configuration that does not have such an annular duct or equivalent structure (such as struts forming a space frame) connecting the engine to the cabin. Mounted between the cabin and propeller of the Breuner Autogiro is a gearbox and clutch arrangement. A shaft extends forwardly from the engine to said gearbox and clutch arrangement, and a hollow coaxial shaft extends back from said gearbox to said propeller. The present inventor is not aware of any autogiro in the Breuner Autogiro configuration that is roadable or in which structural members connecting the cabin to the engine pass primarily through a propeller barrel.

The Breuner Autogiro offers many advantages over other autogiro configurations. The forward mounted cabin provides good visibility to the pilot. Having the engine in the slipstream of the propeller helps with cooling and eliminates the possibility of engine parts coming loose and causing damage to the propeller. It is safer to have the engine farther from the cabin in case of fire and this arrangement also helps with engine noise because the slipstream carries engine noise away from the cabin. Also, in this configuration the propeller is close to the pylon and the landing gear, where the height profile under the rotor is greatest, allowing for a larger propeller and lower mounted engine. This configuration is also favorable for balancing the weight of the engine and cabin. Having a forward facing engine behind the pylon also allows for direct power take-off from the propeller shaft to prerotate the rotor for take-off. A disadvantage of the Breuner Autogiro is that the annular duct and associated structure adds significant frontal area and overall size to the vehicle, making it unsuitable as a roadable vehicle.

SUMMARY OF THE INVENTION

A vehicle that can operate as either a motorcycle or an autogiro comprising:

a frame having a front part and a rear part;

a propeller that, during flight, rotates around a propeller barrel that is the sole means of connecting the front part of said frame to the rear part of said frame;

a lift means comprising a rotor rotatably mounted to said frame during flight;

front and rear wheels mounted to said frame along the centerline of said vehicle; and an engine mounted to rear part of said frame to power said propeller or said rear wheel.

The invention may optionally incorporate any of the following features:

a monocoque shell attached to or incorporating the front or rear part of said frame;

side wheels retractably and rotatably mounted to said frame;

rotor blades that are extentable/retractable, foldable, or stowable along the sides of said vehicle when said vehicle is not in said flight mode;

said engine and/or an external power source that connects to an external coupling mounted to said rotor powers said rotor to provide for shortened or vertical takeoff;

a rudder and a horizontal stabilizer are affixed to the rear part of said frame;

said engine is adjustably mounted to the rear part of said frame so that said engine can be raised and lowered, thereby switching the supply of mechanical power between said propeller and said rear wheel by slackening and loosing drive belts or meshing and unmeshing gears; and aquatic propulsion means and one or more flotation means attached to said frame.

BRIEF DESCRIPTION OF THE DRAWINGS

FIG. 3A is a cut-away side view showing a cross section of the body shell 12 and engine shell 16 of an embodiment of the invention in its flight configuration.

DESCRIPTION

1. Detailed Description of the Preferred Embodiments

Figure 1:
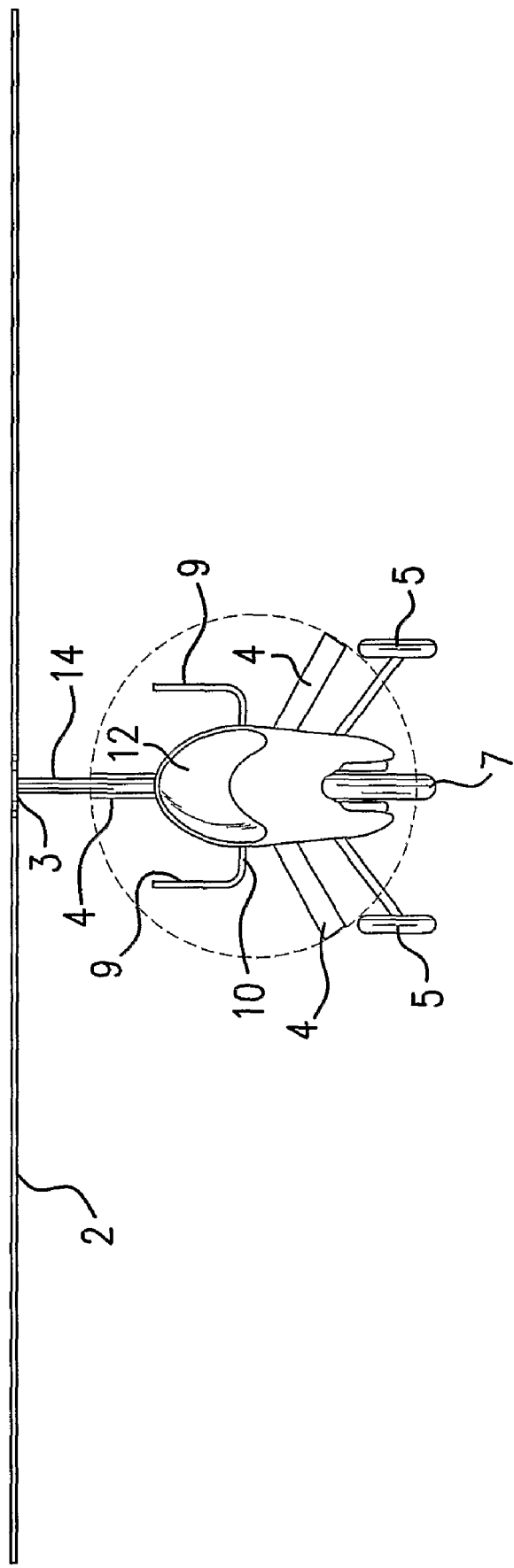
FIG. 1 is a front view of an embodiment of the invention in its flight configuration.

FIG. 1 is a front view of an embodiment of the invention in its flight configuration. The rotor blade 2 is removably connected to the rotor head 3. Rotor head 3 is rotatably connected to rotor pylon 14. Rotor pylon 14 is retractably connected to the body shell 12. Rudders 9 and horizontal stabilizer 10 are foldably and retractably connected to engine shell 16. Propeller 4 is mounted to propeller barrel 11 through which, by bearing mounts (not shown), the body shell 12 connects to the engine shell 16. Engine 1 is adjustably mounted within engine shell 16 so that said engine 1 can be raised and lowered vertically relative to engine shell 16. Retractable side wheels 5 are retractably and rotatably mounted to body shell 12 near the longitudinal center of gravity and serve as rear landing gear in flight configuration and keep the vehicle from tipping over at low speeds in the motorcycle configuration. Means to extend and retract said side wheels may be electrical or mechanical and may be powered by levers, motors, or fluidic actuators such as hydraulic or pneumatic cylinders. The front wheel 7 is rotatably connected to body shell 12 and steerably connected to a control stick 8 and serves as front landing gear in flight configuration and is also the front wheel in the motorcycle configuration.

Figure 2:
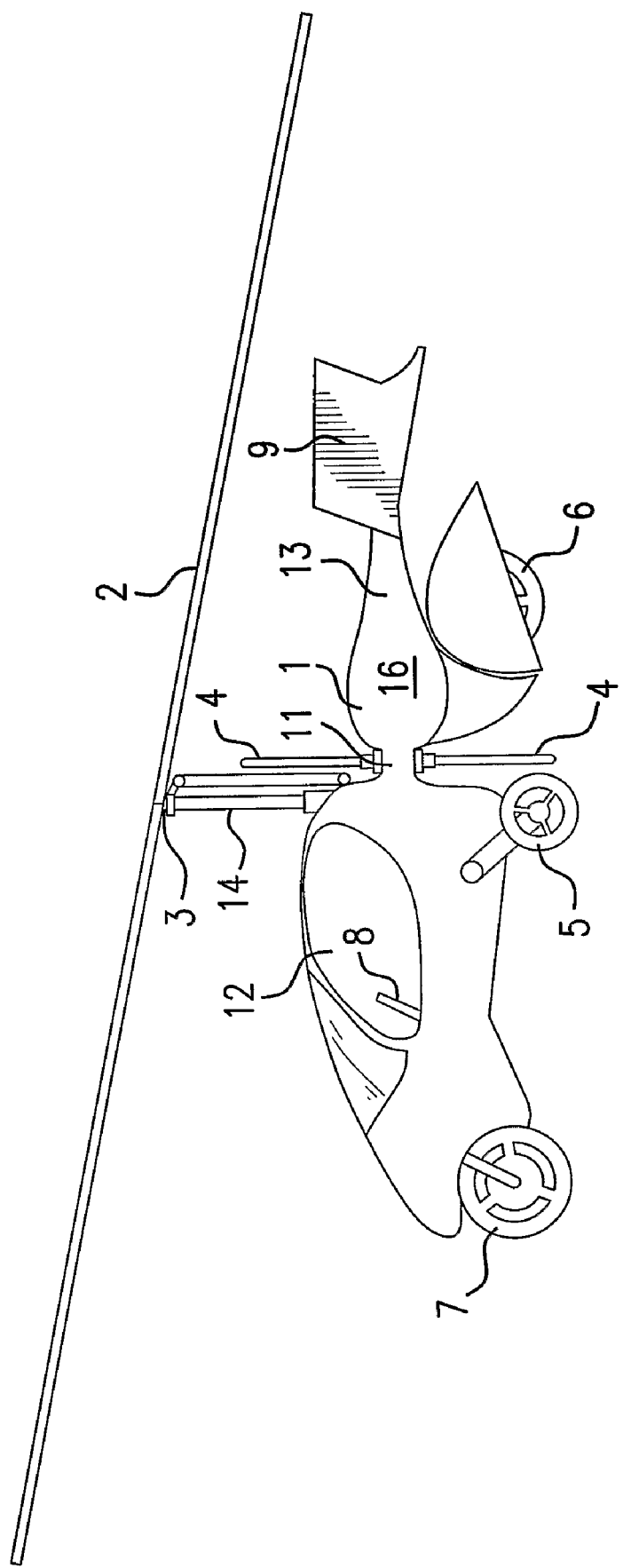
FIG. 2 is a side view of an embodiment of the invention in its flight configuration.

FIG. 2 is a side view of an embodiment of the invention in its flight configuration. The rotor blade 2 is removably connected to the rotor head 3. Rotor head 3 is rotatably connected to rotor pylon 14. Rotor pylon 14 is retractably connected to the body shell 12. Mounted inside body shell 12 is a control stick 8. Propeller 4 is mounted to propeller barrel 11 through which the body shell 12 fixedly connects to the engine shell 16. Engine 1 is adjustably mounted within engine shell 16 so that said engine 1 can be raised and lowered vertically relative to engine shell 16. Rudders 9 and horizontal stabilizer 10 are foldably and retractably connected to engine shell 16. Retractable side wheels 5 are retractably and rotatably mounted to body shell 12 near the longitudinal center of gravity and serve as rear landing gear in flight configuration and keep the vehicle from tipping over at low speeds in the motorcycle configuration. Means to extend and retract said side wheels may be electrical or mechanical and may be powered by levers, motors, or fluidic actuators such as hydraulic or pneumatic cylinders. The front wheel 7 is rotatably connected to body shell 12 and steerably connected to a control stick 8 and serves as front landing gear in flight configuration and is the front wheel in the motorcycle configuration. Rear wheel 6 is rotatably and retractably mounted to engine shell 16 and is raised off the ground when the vehicle is in flight configuration.

Figure 3:
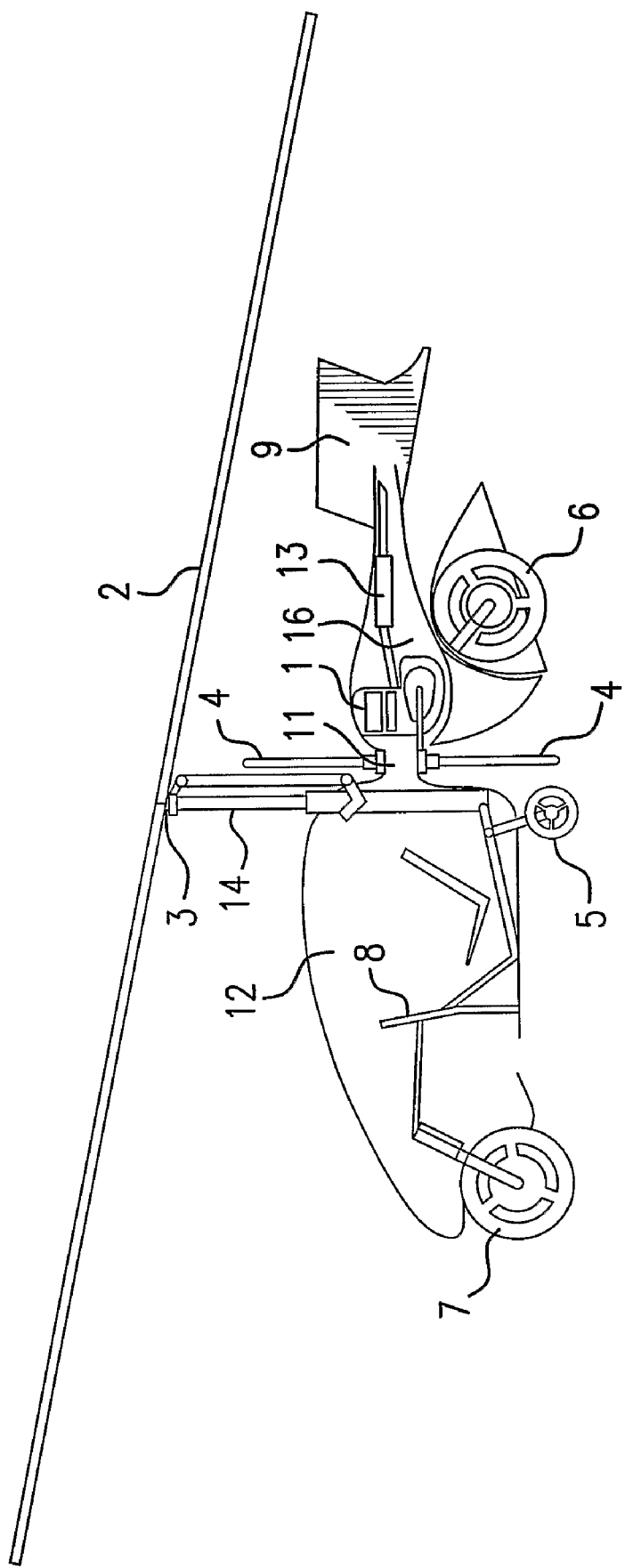
FIG. 3 is a cut-away side view of an embodiment of the invention in its flight configuration.

FIG. 3 is a cut-away side view of an embodiment of the invention in its flight configuration. The rotor blade 2 is removably connected to the rotor head 3. Rotor head 3 is retractably connected to rotor pylon 14. Rotor pylon 14 is retractably connected to the body shell 12. Mounted inside body shell 12 is a control stick 8. Rudders 9 and horizontal stabilizer 10 are foldably and retractably connected to engine shell 16. Propeller 4 is mounted to propeller barrel 11 through which the body shell 12 fixedly connects to the engine shell 16. Engine 1 is adjustably mounted within engine shell 16 so that said engine 1 can be raised and lowered vertically relative to engine shell 16. Exhaust and muffler 13 pass from the engine 1 through engine shell 16 to the rear of the vehicle. Retractable side wheels 5 are retractably and rotatably mounted to body shell 12 and serve as rear landing gear in flight configuration and keep the vehicle from tipping over at low speeds in the motorcycle configuration. Means to extend and retract said side wheels may be electrical or mechanical and may be powered by levers, motors, or fluidic actuators such as hydraulic or pneumatic cylinders. The front wheel 7 is rotatably connected to body shell 12 and steerably connected to a control stick 8 and serves as front landing gear in flight configuration and is the front wheel in the motorcycle configuration. Rear wheel 6 is rotatably and retractably mounted to engine shell 16 and is raised off the ground when the vehicle is in flight configuration.

FIG. 3A is a cut-away side view showing a cross section of the body shell 12 and engine shell 16 of an embodiment of the invention in its flight configuration. The rotor blade 2 is removably connected to the rotor head 3. Rotor head 3 is rotatably connected to rotor pylon 14. Rotor pylon 14 is retractably connected to the body shell 12. Propeller 4 is mounted to propeller barrel 11 through which the body shell 12 connects to the engine shell 16. Engine 1 is adjustably mounted within engine shell 16 so that said engine 1 can be raised and lowered vertically relative to engine shell 16. Retractable side wheels 5 are retractably and rotatably mounted to body shell 12 and serve as rear landing gear in flight configuration and keep the vehicle from tipping over at low speeds in the motorcycle configuration. Means to extend and retract said side wheels may be electrical or mechanical and may be powered by levers, motors, or fluidic actuators such as hydraulic or pneumatic cylinders. The front wheel 7 is rotatably connected to body shell 12. Rear wheel 6 is rotatably and retractably mounted to engine shell 16 and is raised off the ground when the vehicle is in flight configuration. Though this figure shows a mechanical linkage between control stick 8 and front wheel 7, steering could likewise be achieved by other means, such as electronic controls and fly-by-wire servos.

Figure 4:
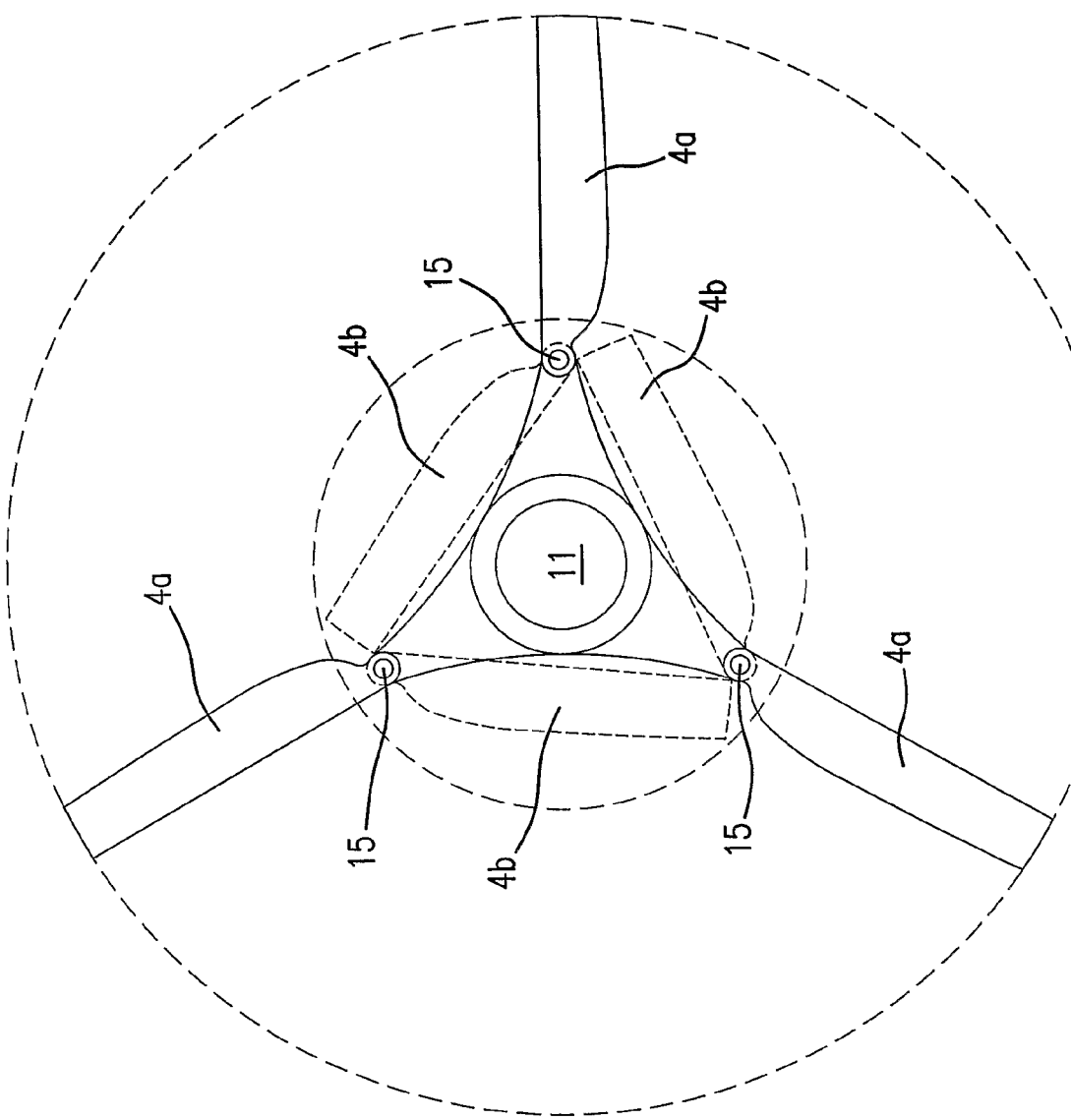
FIG. 4 is a front view of an embodiment of the invention's propeller 4.

FIG. 4 is a front view of an embodiment of the invention's propeller 4. Propeller 4 is mounted to propeller barrel 11 through which the body shell 12 (not shown) fixedly connects to the engine shell 16 (not shown). The propeller blades 4 can be extended or retracted from their pivot points 15. In flight configuration, the propeller blades 4A are extended. In ground configuration, the propeller blades 4B (represented by dashed lines) are retracted, to reduce frontal area and increase ground clearance to improve roadability.

Figure 4A:
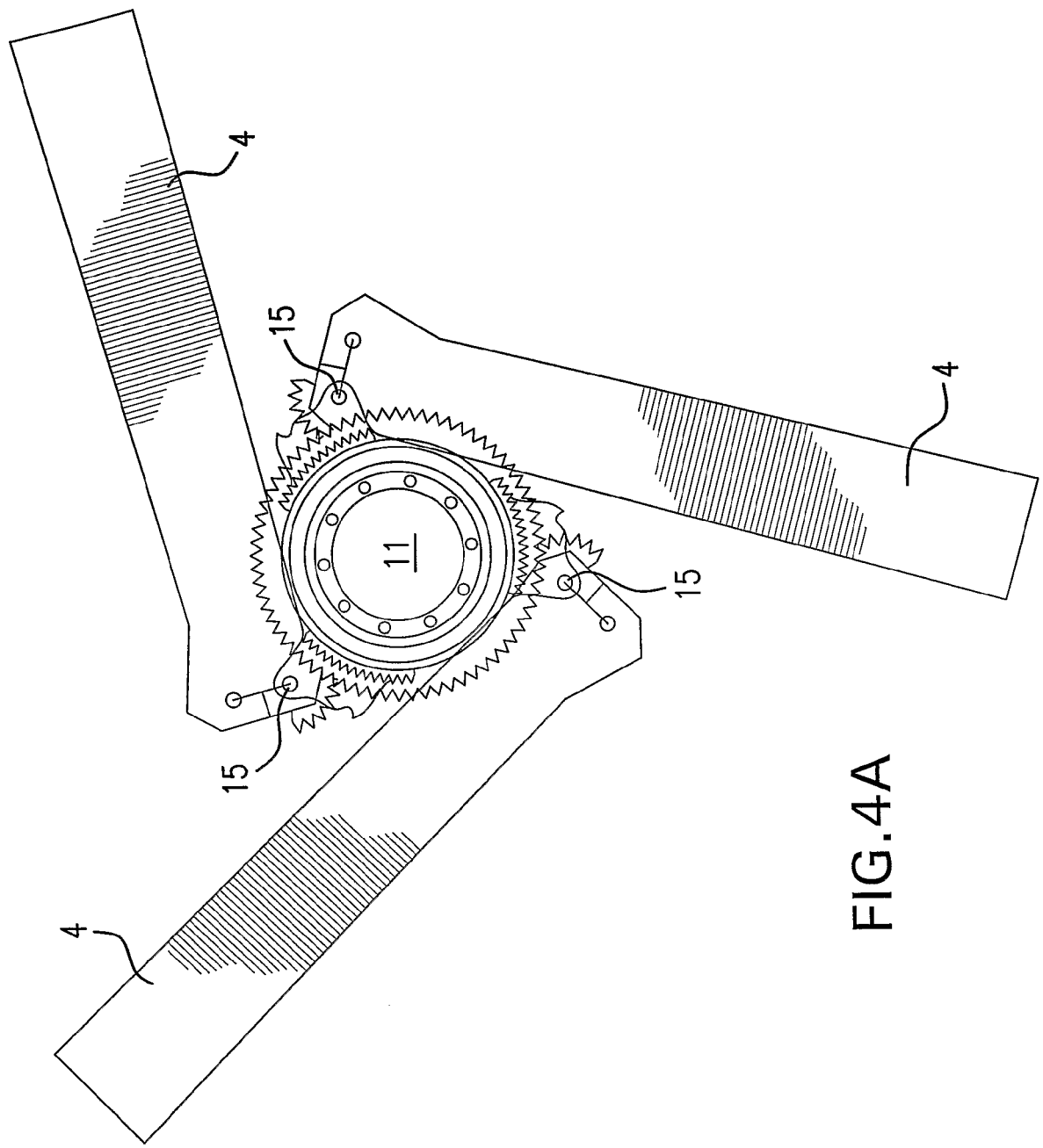
FIG. 4A is a front view of an embodiment of the invention's propeller 4 folded for motorcycle mode.

FIG. 4A is a front view of an embodiment of the invention's propeller 4 folded for motorcycle mode to reduce frontal area and increase ground clearance to improve roadability.

Figure 4B:
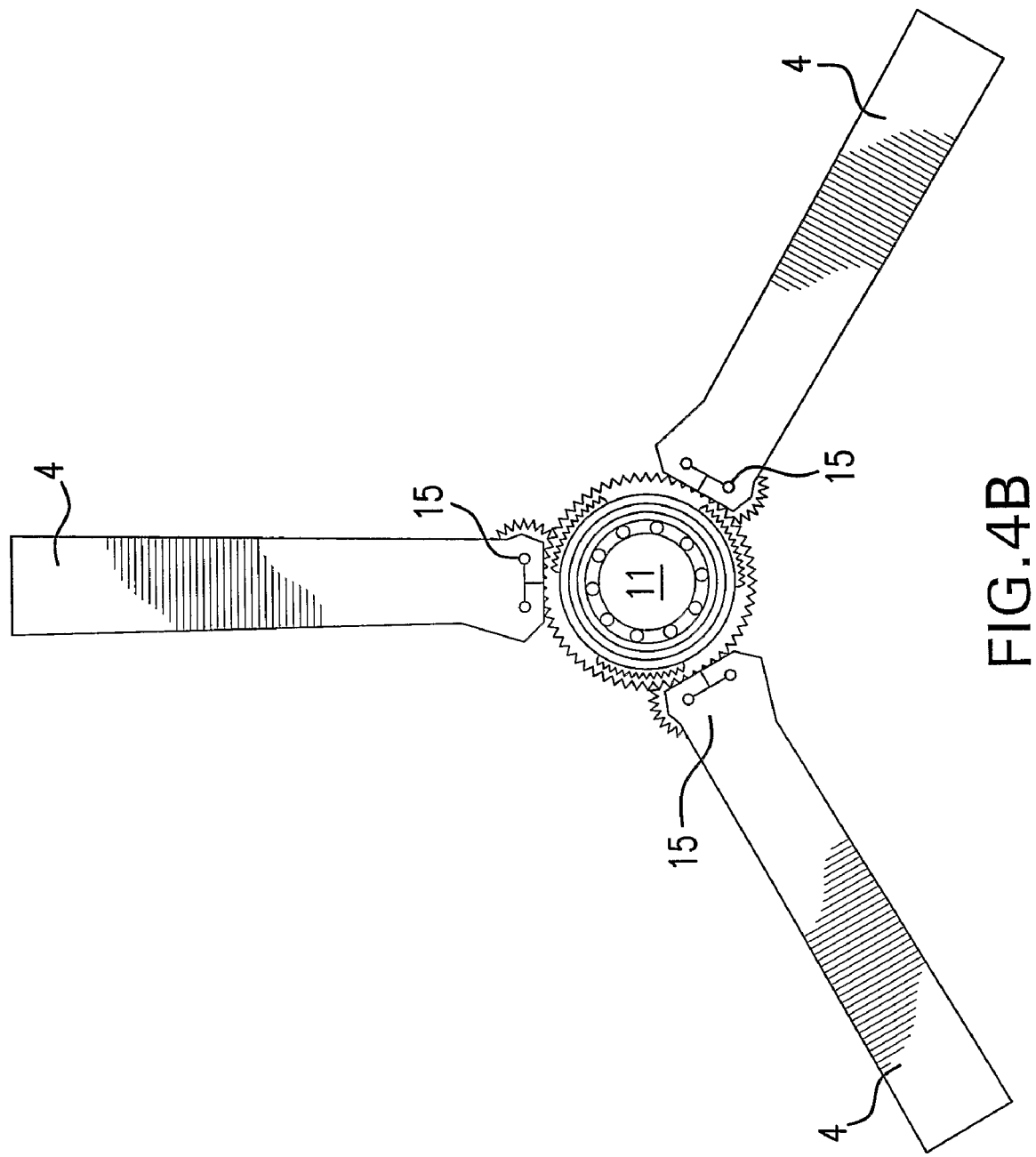
FIG. 4B is a front view of an embodiment of the invention's propeller 4 extended for flight mode

FIG. 4B is a front view of an embodiment of the invention's propeller 4 extended for flight mode.

Figure 5:
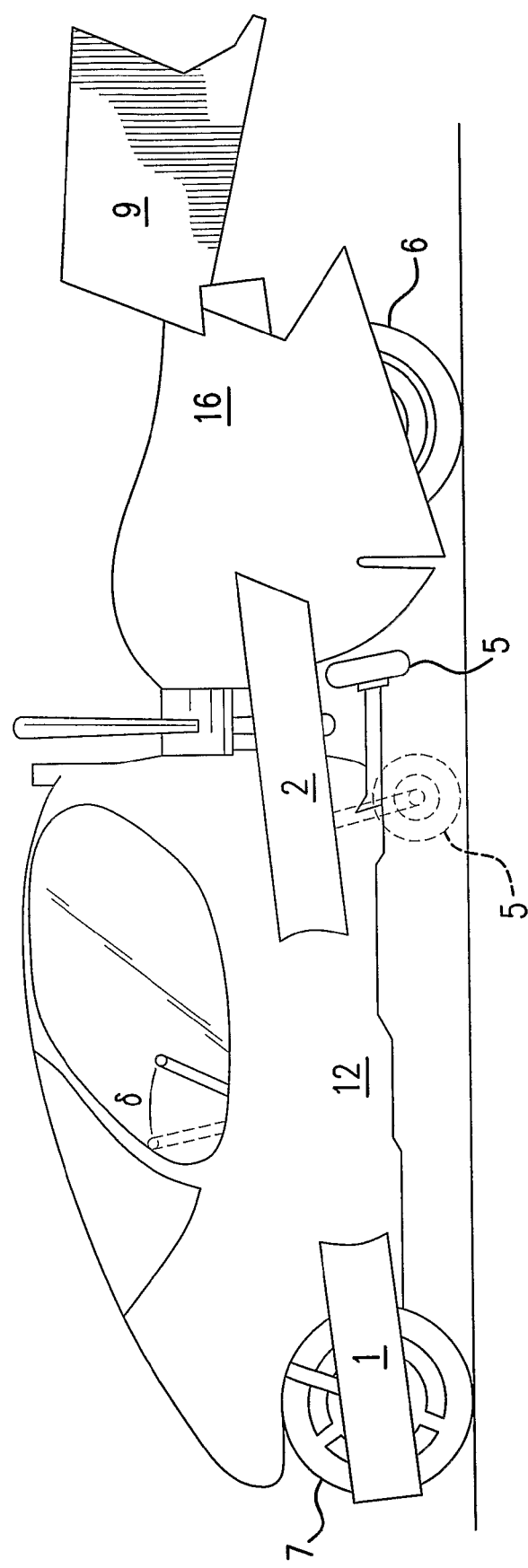
FIG. 5 is a side view of an embodiment of the invention in motorcycle configuration.

FIG. 5 is a side view of an embodiment of the invention in motorcycle configuration. Propeller blades 4 are retracted and no longer rotate around the propeller barrel 11 through which the body shell 12 fixedly connects to the engine shell 16. Engine 1 (not visible) is adjustably mounted within engine shell 16 so that said engine 1 can be raised and lowered vertically relative to engine shell 16. Rudders 9 and horizontal stabilizer 10 are foldably and retractably connected to engine shell 16. The rotor blades 2 are removably stowed alongside the body shell 12. Retractable side wheels 5 are retractably and rotatably mounted to body shell 12 and serve as rear landing gear in flight configuration and keep the vehicle from tipping over at low speeds in the motorcycle configuration. Mounted inside body shell 12 is a control stick 8, by which said side wheels 5 can be extended (dashed lines) and retracted (solid lines). Means to extend and retract said side wheels may be electrical or mechanical and may be powered by levers, motors, or fluidic actuators such as hydraulic or pneumatic cylinders. The front wheel 7 is rotatably connected to body shell 12 and steerably connected to control stick 8 and serves as front landing gear in flight configuration and is the front wheel in the motorcycle configuration. Rear wheel 6 is rotatably and retractably mounted to engine shell 16 and is lowered to the ground when the vehicle is in motorcycle configuration.

Figure 6:
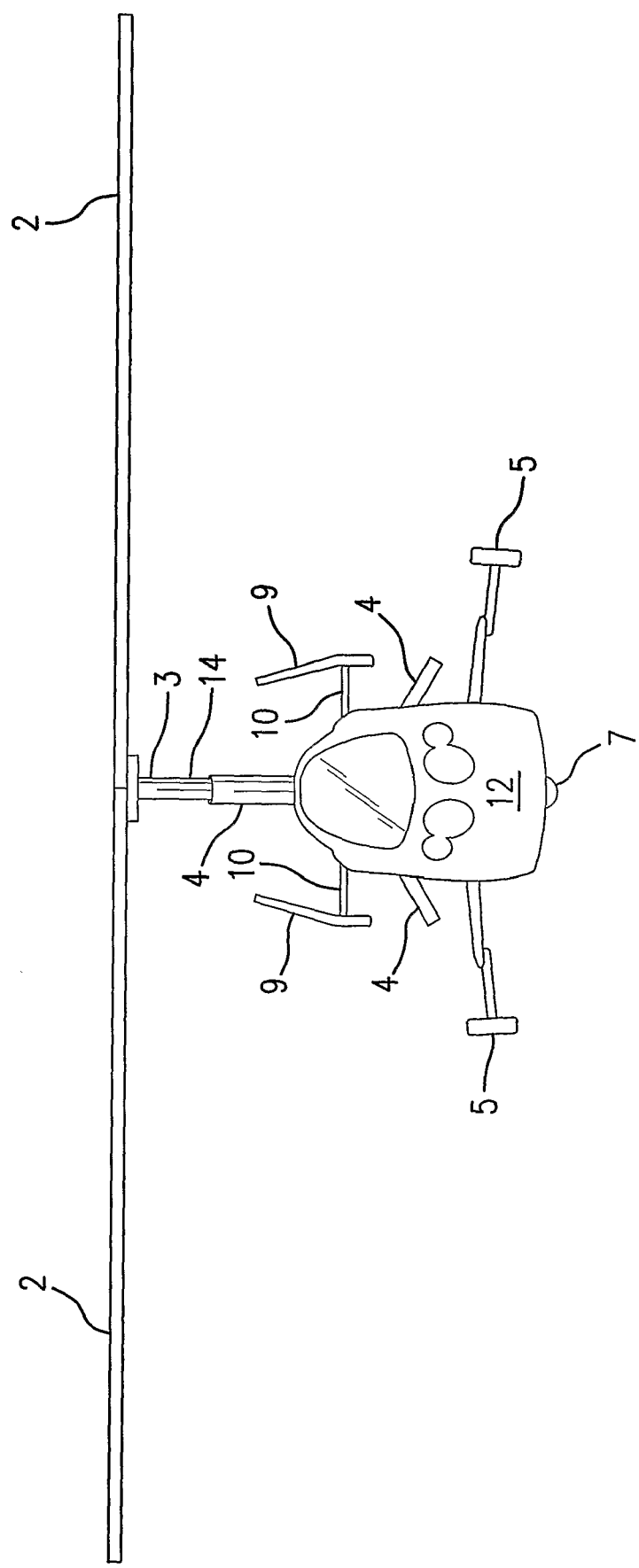
FIG. 6 is a front view of an amphibious embodiment of the invention in its flight configuration.

FIG. 6 is a front view of an amphibious embodiment of the invention in its flight configuration. The rotor blade 2 is removably connected to the rotor head 3. Rotor head 3 is rotatably connected to rotor pylon 14. Rotor pylon 14 is retractably connected to the watertight body shell 12. Rudders 9 and horizontal stabilizer 10 are foldably and retractably connected to engine shell 16 (not visible). Retractable side wheels 5 are retractably and rotatably mounted to watertight body shell 12 near the longitudinal center of gravity and serve as main landing gear in flight configuration and keep the vehicle from tipping over in the water craft configuration and at low speeds in the motorcycle configuration. Means to extend and retract said side wheels may be electrical or mechanical and may be powered by levers, motors, or fluidic actuators such as hydraulic or pneumatic cylinders. The front wheel 7 is rotatably connected to body shell 12 and steerably connected to a control stick 8 (not visible) and serves as front landing gear in flight configuration and is also the front wheel in the motorcycle configuration.

Figure 7:
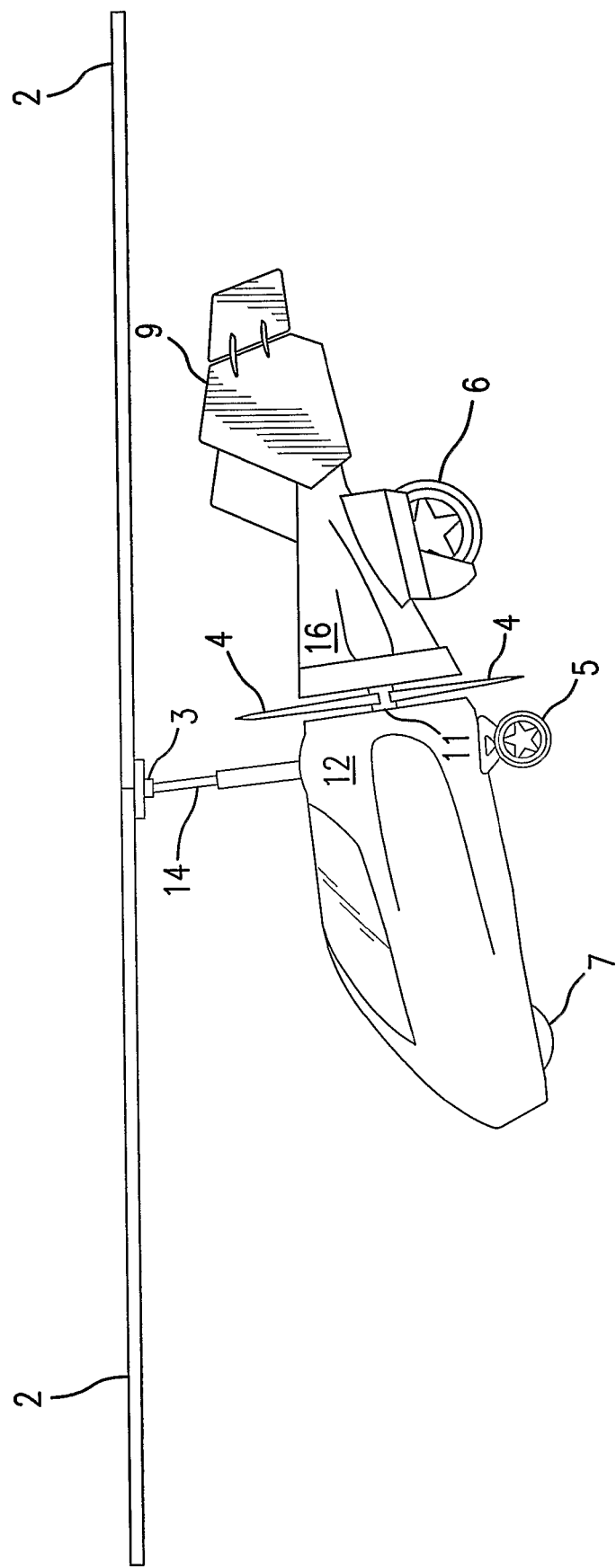
FIG. 7 is a side view of an amphibious embodiment of the invention in its flight configuration.

FIG. 7 is a side view of an amphibious embodiment of the invention in its flight configuration. The rotor blade 2 is removably connected to the rotor head 3. Rotor head 3 is rotatably connected to rotor pylon 14. Rotor pylon 14 is retractably connected to the watertight body shell 12. Rudders 9 and horizontal stabilizer 10 are foldably and retractably connected to engine shell 16. Rear wheel 6 is retractably and rotatably connected to engine shell 16 and is raised off the ground when the vehicle is in flight configuration. Side wheels 5 are retractably and rotatably mounted to body shell 12 near the longitudinal center of gravity and serve as main landing gear in flight configuration and keep the vehicle from tipping over in the water craft configuration and at low speeds in the motorcycle configuration. Means to extend and retract said side wheels may be electrical or mechanical and may be powered by levers, motors, or fluidic actuators such as hydraulic or pneumatic cylinders. The front wheel 7 is rotatably connected to body shell 12 and steerably connected to a control stick 8 and serves as front landing gear in flight configuration and is the front wheel in the motorcycle configuration. Propeller 4 is mounted to propeller barrel 11 through which the body shell 12 fixedly connects to the engine shell 16. Engine 1 (not visible) is adjustably mounted within engine shell 16 so that said engine 1 can be raised and lowered vertically relative to engine shell 16.

Figure 8:
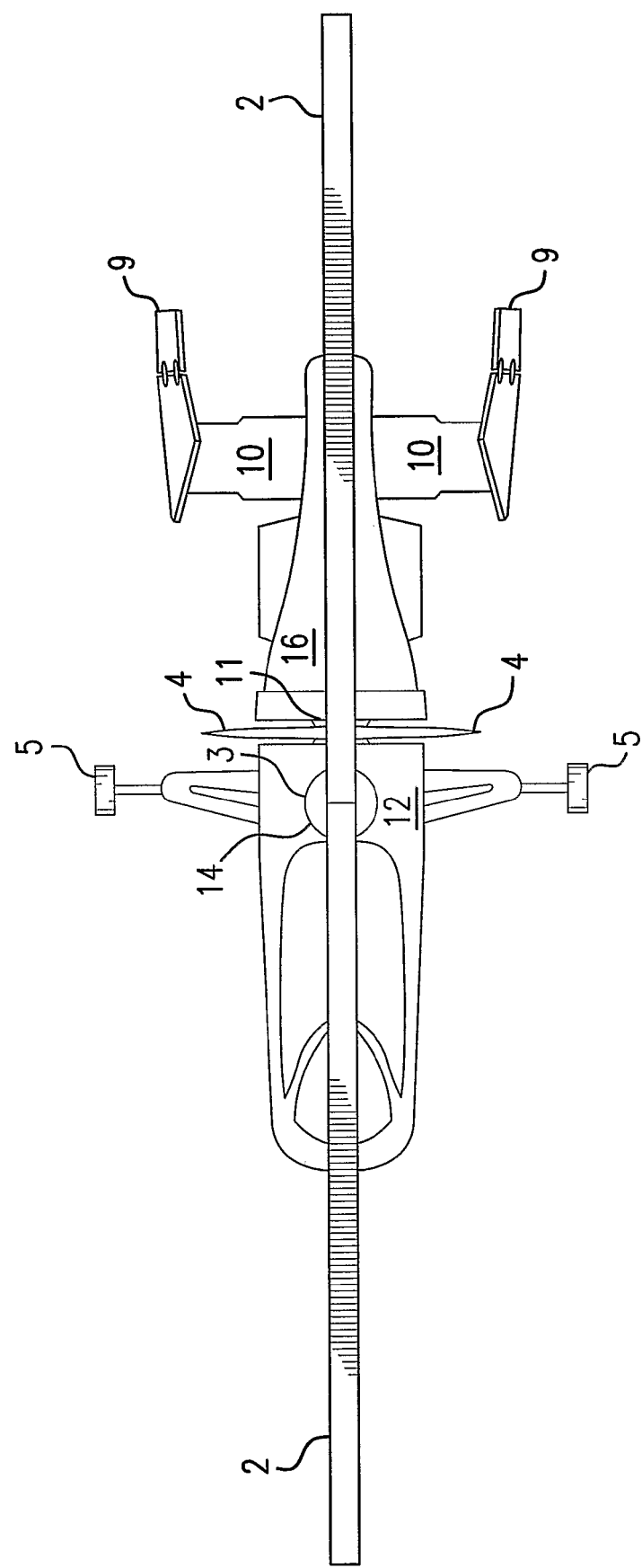
FIG. 8 is a top view of an amphibious embodiment of the invention in its flight configuration.

FIG. 8 is a top view of an amphibious embodiment of the invention in its flight configuration. The rotor blade 2 is removably connected to the rotor head 3. Rotor head 3 is rotatably connected to rotor pylon 14. Rotor pylon 14 is retractably connected to the body shell 12. Rudders 9 and horizontal stabilizer 10 are foldably and retractably connected to engine shell 16. Side wheels 5 are retractably and rotatably mounted to body shell 12 and serve as main landing gear in flight configuration and keep the vehicle from tipping over in the water craft configuration and at low speeds in the motorcycle configuration. Means to extend and retract said side wheels may be electrical or mechanical and may be powered by levers, motors, or fluidic actuators such as hydraulic or pneumatic cylinders. Propeller 4 is mounted to propeller barrel 11 through which the body shell 12 fixedly connects to the engine shell 16. Engine 1 (not visible) is adjustably mounted within engine shell 16 so that said engine 1 can be raised and lowered vertically relative to engine shell 16.

Figure 9:
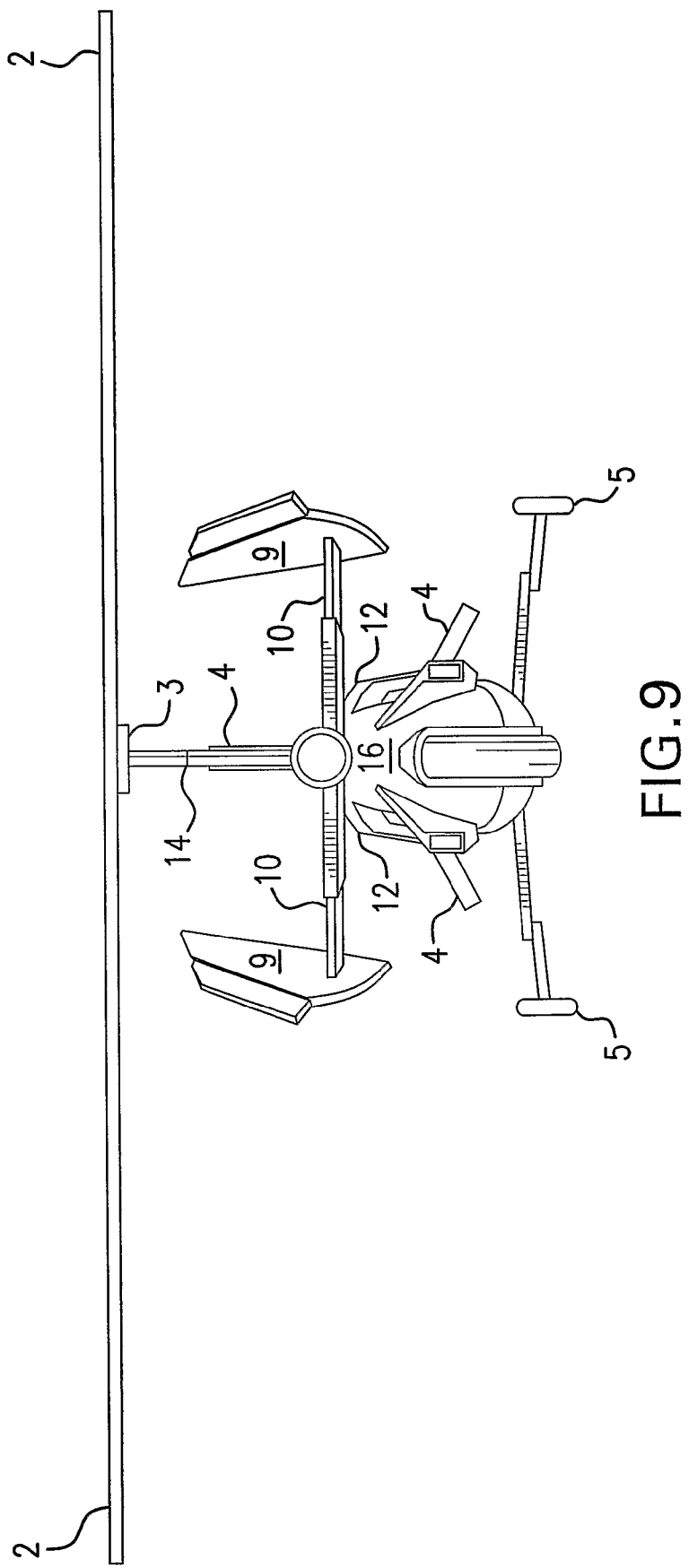
FIG. 9 is a rear view of an amphibious embodiment of the invention in its flight configuration.

FIG. 9 is a rear view of an amphibious embodiment of the invention in its flight configuration. The rotor blade 2 is removably connected to the rotor head 3. Rotor head 3 is rotatably connected to rotor pylon 14. Rotor pylon 14 is retractably connected to the body shell 12. Rudders 9 and horizontal stabilizer 10 are foldably and retractably connected to engine shell 16. Side wheels 5 are retractably and rotatably mounted to body shell 12 and serve as main landing gear in flight configuration and keep the vehicle from tipping over in the water craft configuration and at low speeds in the motorcycle configuration. Means to extend and retract said side wheels may be electrical or mechanical and may be powered by levers, motors, or fluidic actuators such as hydraulic or pneumatic cylinders. Propeller 4 is mounted to propeller barrel 11 (not visible).

Figure 10:
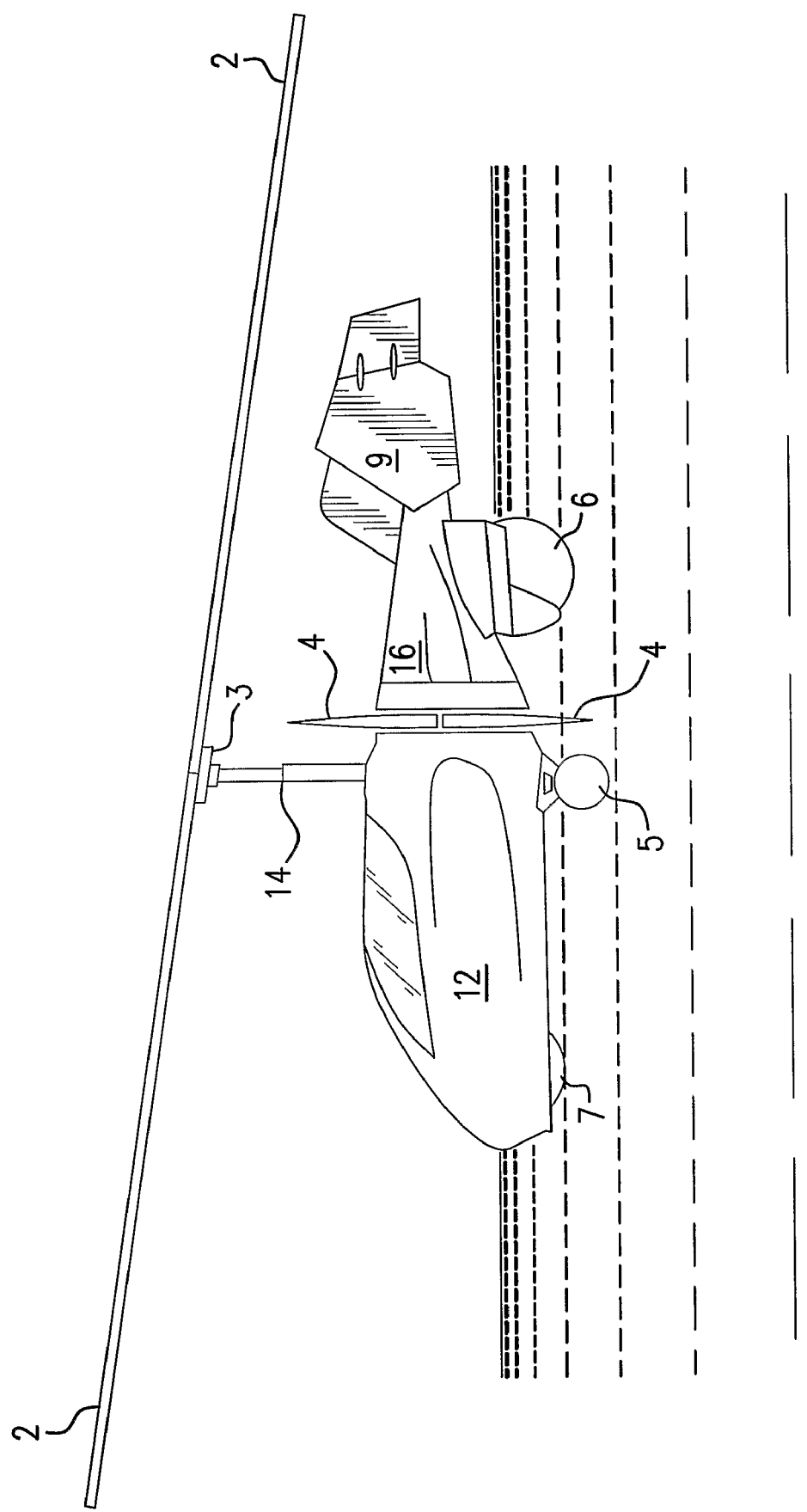
FIG. 10 is a side view of an amphibious embodiment of the invention in its water craft configuration.

FIG. 10 is a side view of an amphibious embodiment of the invention in its water craft configuration. The rotor blade 2 is removably connected to the rotor head 3. Rotor head 3 is rotatably connected to rotor pylon 14. Rotor pylon 14 is retractably connected to the body shell 12 that is buoyant. Rudders 9 and horizontal stabilizer 10 are foldably and retractably connected to engine shell 16. Rear wheel 6 is retractably and rotatably connected to engine shell 16 and is raised to its elevated position and is buoyant when the vehicle is in water craft configuration. Retractable side wheels 5 are retractably and rotatably mounted to body shell 12 and keep the vehicle from tipping over and are buoyant in the water craft configuration. Means to extend and retract said side wheels may be electrical or mechanical and may be powered by levers, motors, or fluidic actuators such as hydraulic or pneumatic cylinders. The front wheel 7, which is buoyant, is rotatably connected to body shell 12 and steerably connected to a control stick 8. Means, such as additional inflation volume, may be provided to increase displacement of rear wheel 6, side wheels 5, and front wheel 7 for additional buoyancy. Propeller 4 is mounted to propeller barrel 11 through which the body shell 12 connects to the engine shell 16. Engine 1 (not visible) is adjustably mounted within engine shell 16 so that said engine 1 can be raised and lowered vertically relative to engine shell 16.

Figure 11:
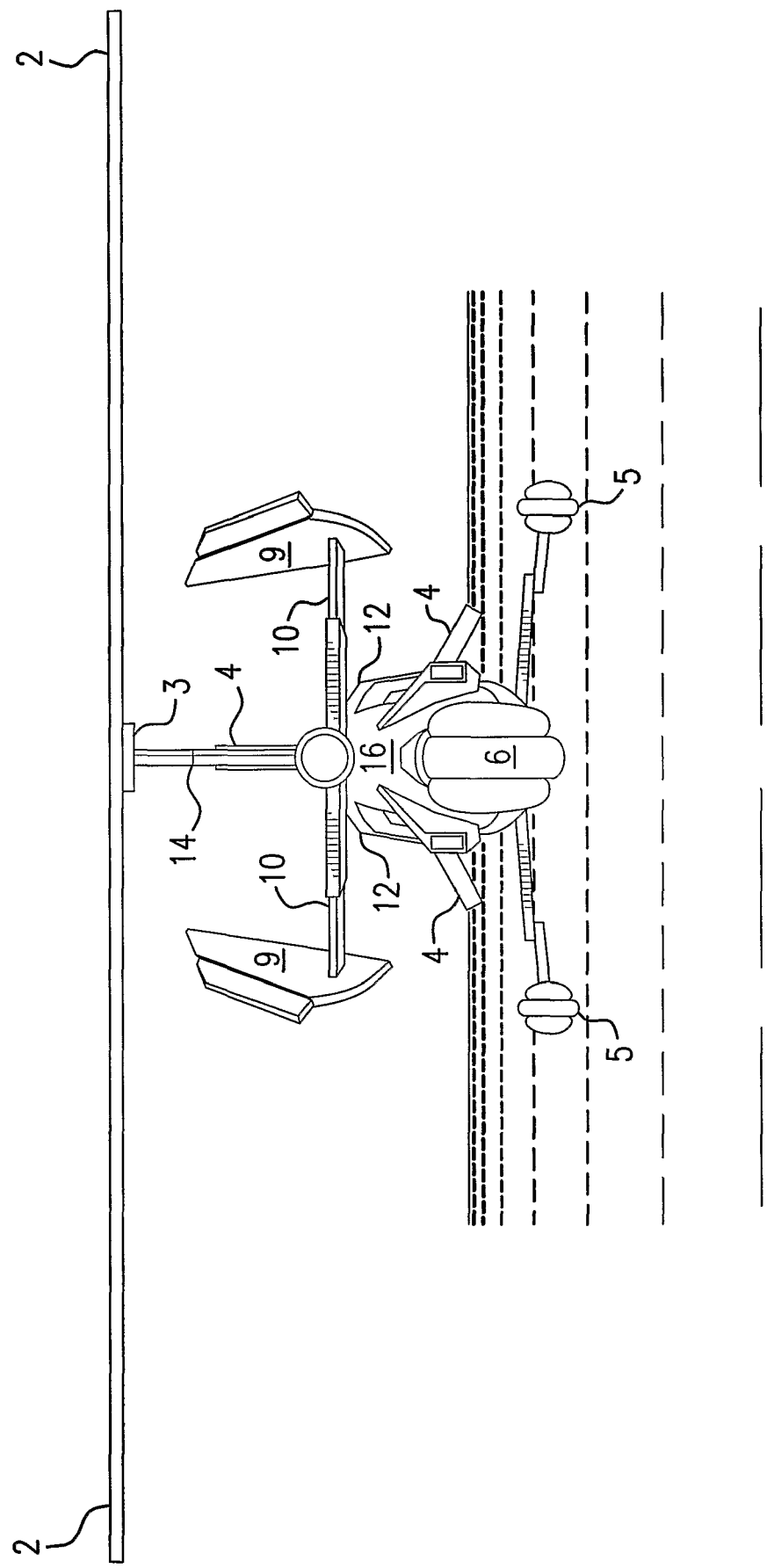
FIG. 11 is a rear view of an amphibious embodiment of the invention in its water craft configuration.

FIG. 11 is a rear view of an amphibious embodiment of the invention in its water craft configuration. The rotor blade 2 is removably connected to the rotor head 3. Rotor head 3 is rotatably connected to rotor pylon 14. Rotor pylon 14 is retractably connected to the body shell 12 that is buoyant. Rudders 9 and horizontal stabilizer 10 are foldably and retractably connected to engine shell 16. Side wheels 5 are retractably and rotatably mounted to body shell 12 and serve as main landing gear in flight configuration and keep the vehicle from tipping over and are buoyant in the water craft configuration. Means to extend and retract said side wheels may be electrical or mechanical and may be powered by levers, motors, or fluidic actuators such as hydraulic or pneumatic cylinders. Propeller 4 is mounted to propeller barrel 11 (not visible).

Figure 12:
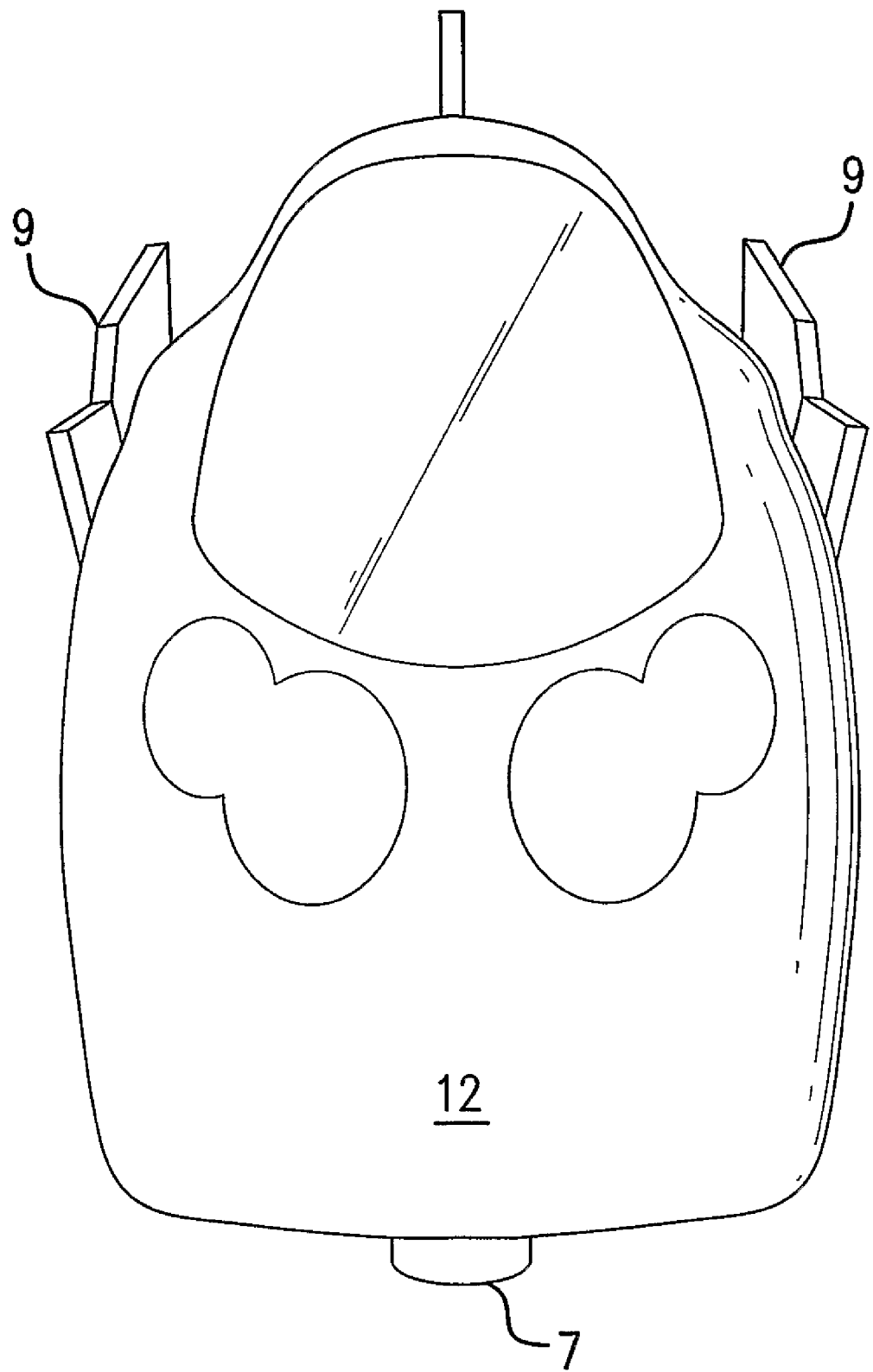
FIG. 12 is a front view of an amphibious embodiment of the invention in its motorcycle configuration.

FIG. 12 is a front view of an amphibious embodiment of the invention in its motorcycle configuration. Rudders 9 and horizontal stabilizer 10 (not visible) are foldably and retractably connected to engine shell 16 (not visible) and are folded and retracted close to the engine shell 16 in motorcycle mode. The front wheel 7 is rotatably connected to body shell 12 and steerably connected to a control stick 8 (not visible).

Figure 13:
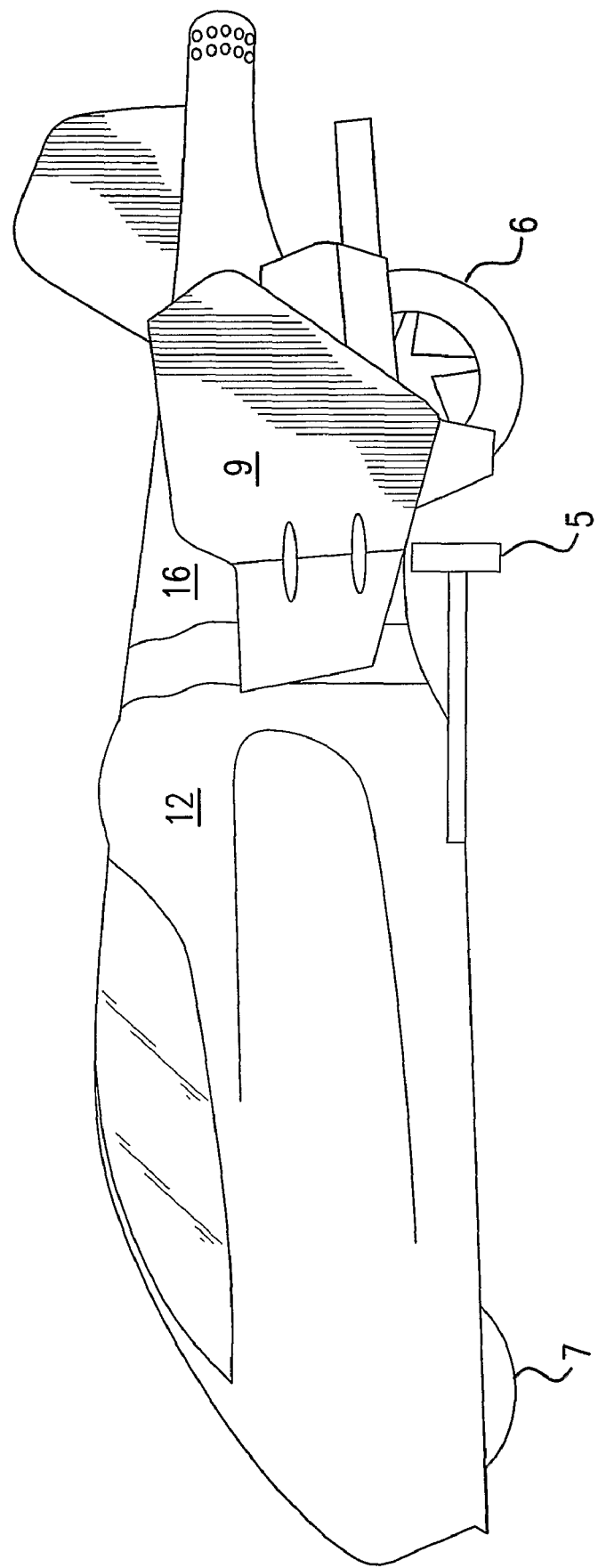
FIG. 13 is a side view of an amphibious embodiment of the invention in its motorcycle configuration.

FIG. 13 is a side view of an amphibious embodiment of the invention in its motorcycle configuration. Rudders 9 and horizontal stabilizer 10 (not visible) are foldably and retractably connected to engine shell 16. Rear wheel 6 is retractably and rotatably connected to engine shell 16 and is lowered to the ground when the vehicle is in motorcycle configuration. Retractable side wheels 5 are retractably and rotatably mounted to body shell 12 and keep the vehicle from tipping over at low speeds in the motorcycle configuration. Means to extend and retract said side wheels may be electrical or mechanical and may be powered by levers, motors, or fluidic actuators such as hydraulic or pneumatic cylinders. The front wheel 7 is rotatably connected to body shell 12 and steerably connected to a control stick 8. Propeller 4 is folded in motorcycle configuration and is not visible.

Figure 13A:
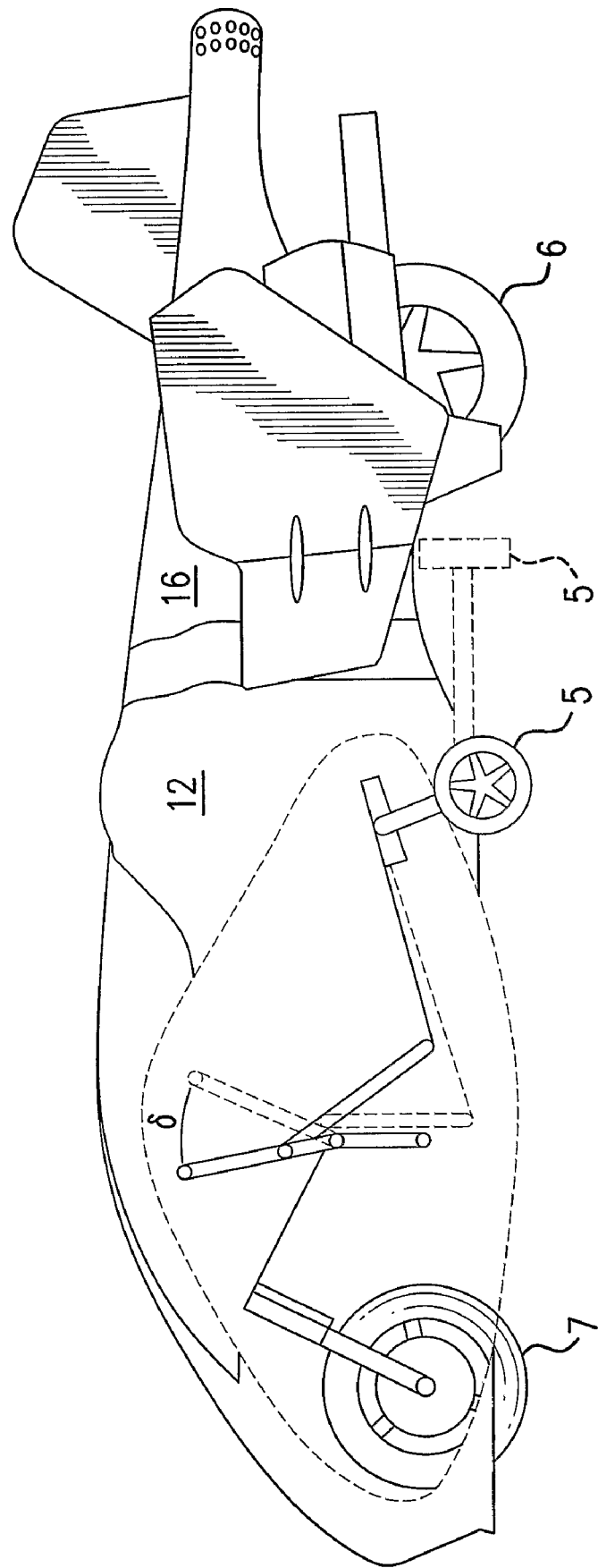
FIG. 13A is a cut-away side view of an amphibious embodiment of the invention in its motorcycle configuration.

FIG. 13A is a cut-away side view of an amphibious embodiment of the invention in motorcycle configuration. Mounted inside body shell 12 is a control stick 8, which can extend (solid lines) and retract (dashed lines) the side wheels 5. Side wheels 5 are retractably and rotatably mounted to body shell 12 and can be extended to keep the vehicle from tipping over at low speeds in the motorcycle configuration. Means to extend and retract said side wheels may be electrical or mechanical and may be powered by levers, motors, or fluidic actuators such as hydraulic or pneumatic cylinders. The front wheel 7 is rotatably connected to body shell 12 and steerably connected to a control stick 8. Rear wheel 6 rotatably and retractably connected to engine shell 16 and is lowered to the ground. Though this figure shows a mechanical linkage between control stick 8 and side wheels 5, retraction and extension could likewise be achieved by other means, such as electronic controls and fly-by-wire servos.

Figure 14:
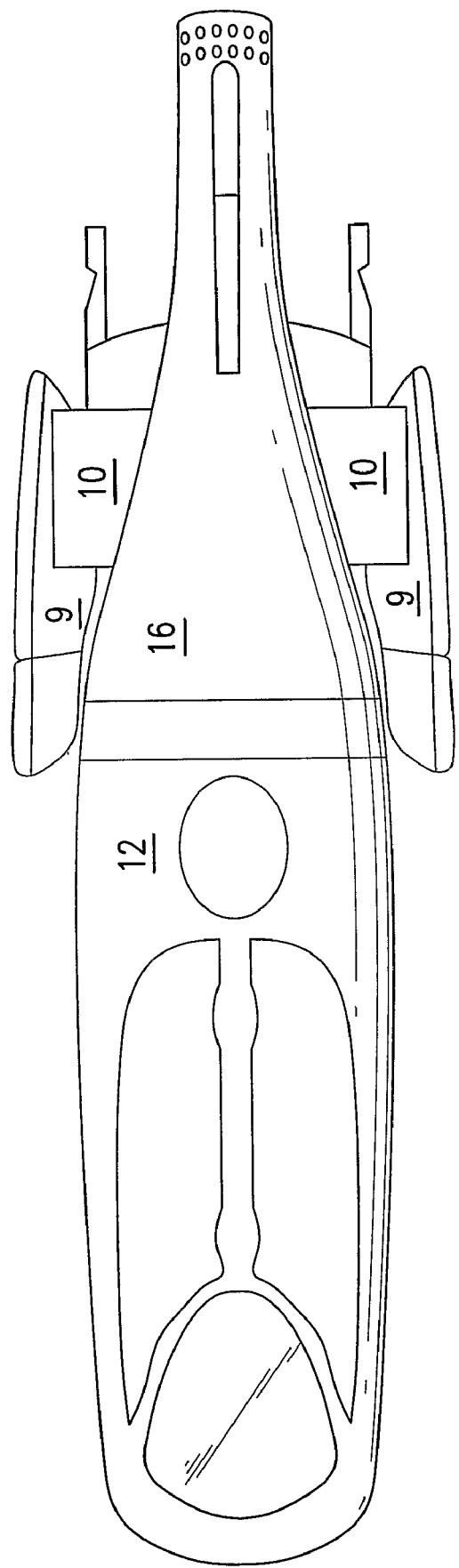
FIG. 14 is a top view of an amphibious embodiment of the invention in its motorcycle configuration.

FIG. 14 is a top view of an amphibious embodiment of the invention in its motorcycle configuration. Rudders 9 and horizontal stabilizer 10 are foldably and retractably connected to engine shell 16. Retractable side wheels 5 are retractably and rotatably mounted to body shell 12 and serve as rear landing gear in flight configuration and keep the vehicle from tipping over in the water craft configuration and at low speeds in the motorcycle configuration. Means to extend and retract said side wheels may be electrical or mechanical and may be powered by levers, motors, or fluidic actuators such as hydraulic or pneumatic cylinders. The blades of propeller 4 are folded and are not visible.

Figure 15:
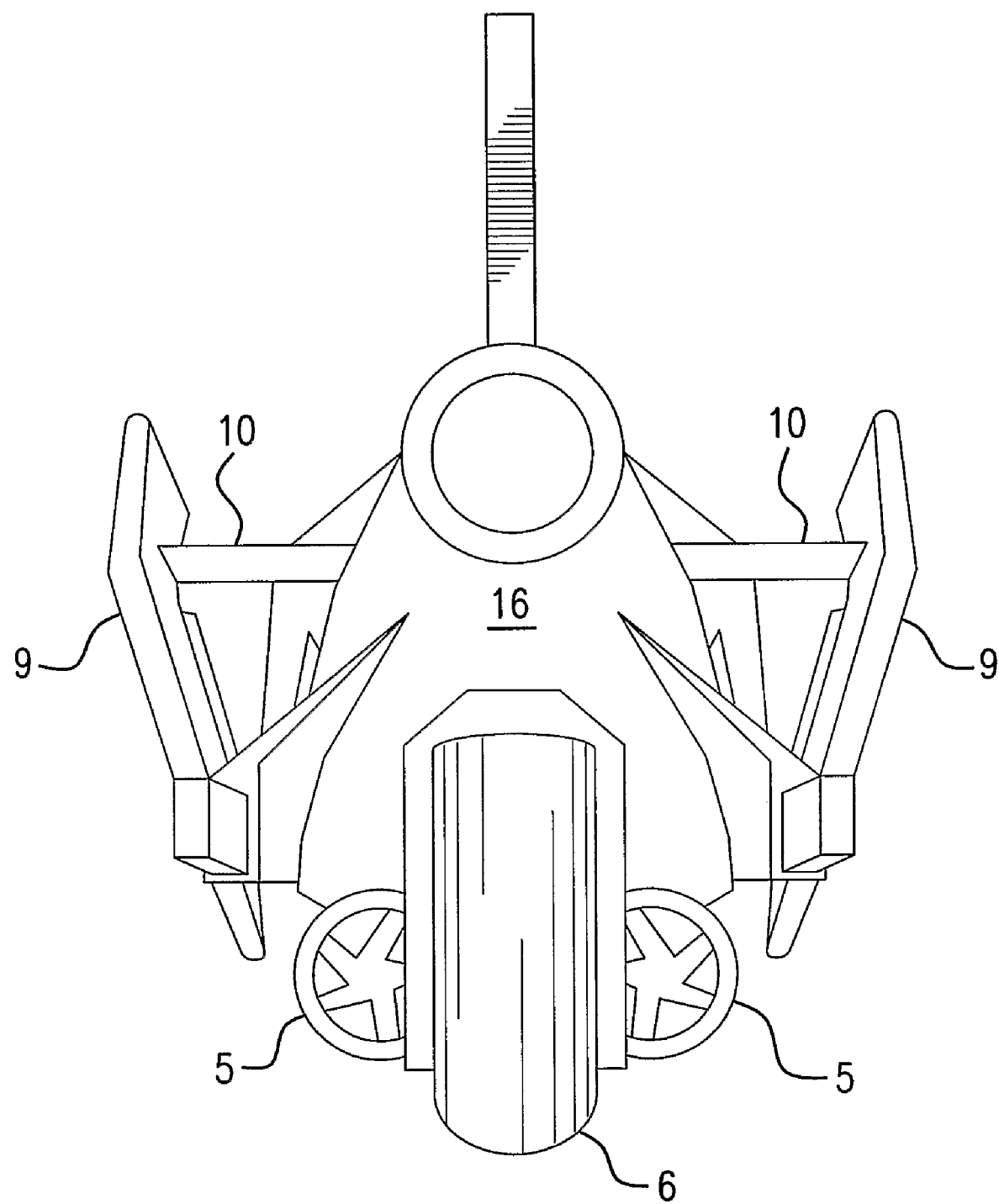
FIG. 15 is a rear view of an amphibious embodiment of the invention in its motorcycle configuration.

FIG. 15 is a rear view of an amphibious embodiment of the invention in its motorcycle configuration. Rudders 9 and horizontal stabilizer 10 are foldably and retractably connected to engine shell 16. Retractable side wheels 5 are retractably and rotatably mounted to body shell 12 and keep the vehicle from tipping over at low speeds in the motorcycle configuration. Means to extend and retract said side wheels may be electrical or mechanical and may be powered by levers, motors, or fluidic actuators such as hydraulic or pneumatic cylinders.

Figure 16:
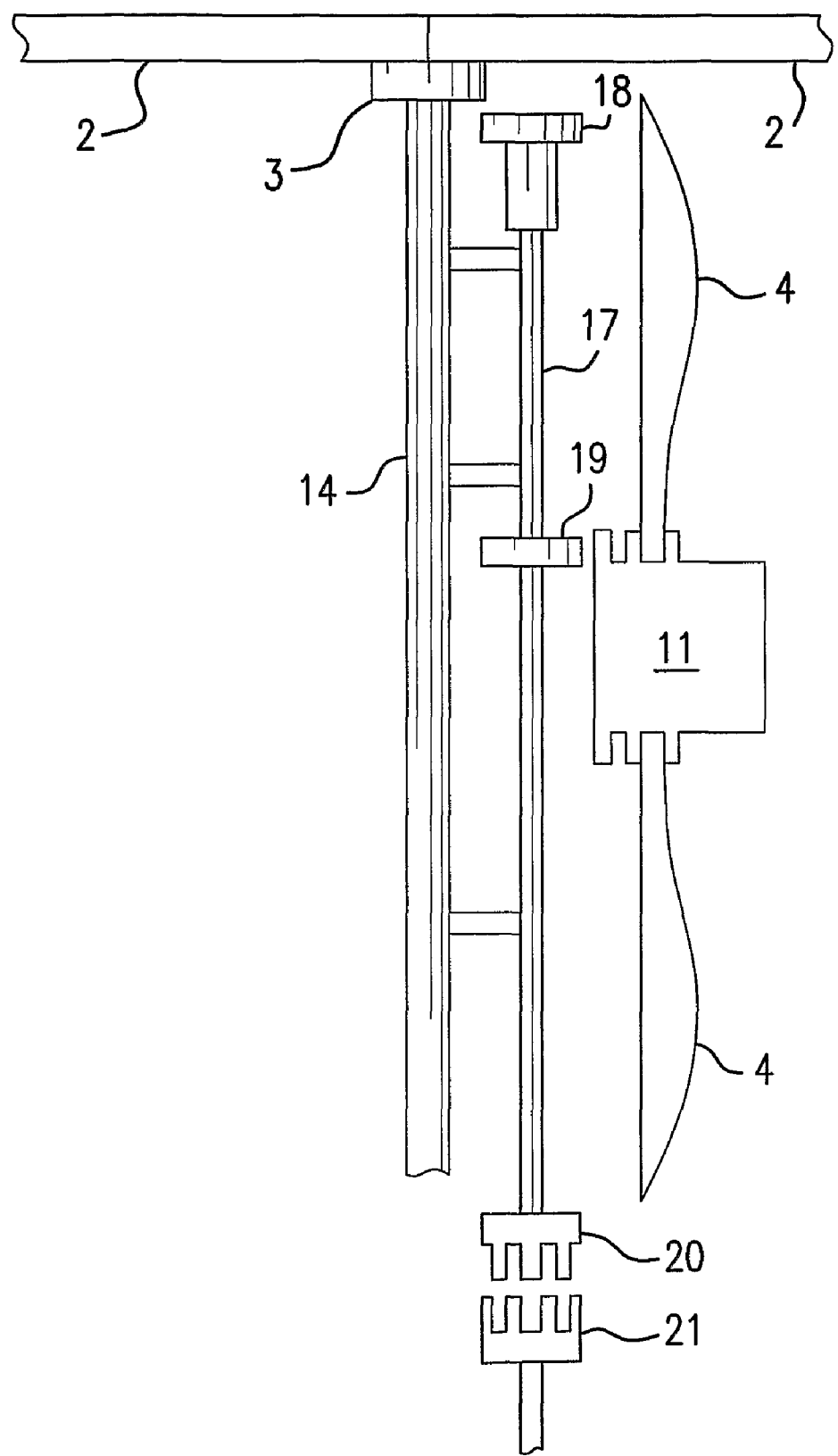
FIG. 16 is a side view of the prerotator assembly in autorotation configuration, where the rotor spins freely, as during normal flight.

FIG. 16 is a side view of the prerotator assembly in autorotation configuration, where the rotor spins freely, as during normal flight. Drive wheel 18, friction wheel 19, and coupling 20 are all fixedly mounted to drive wheel shaft 17. Drive wheel shaft 17 is slidably and rotatably mounted to rotor pylon 14. Rotor head 3 is rotatably mounted to rotor pylon 14. Rotor blades 2 are removably mounted to rotor head 3. Coupling 20 is disengaged from external coupling 21. Propeller barrel 11 is disengaged from friction wheel 19.

Figure 17:
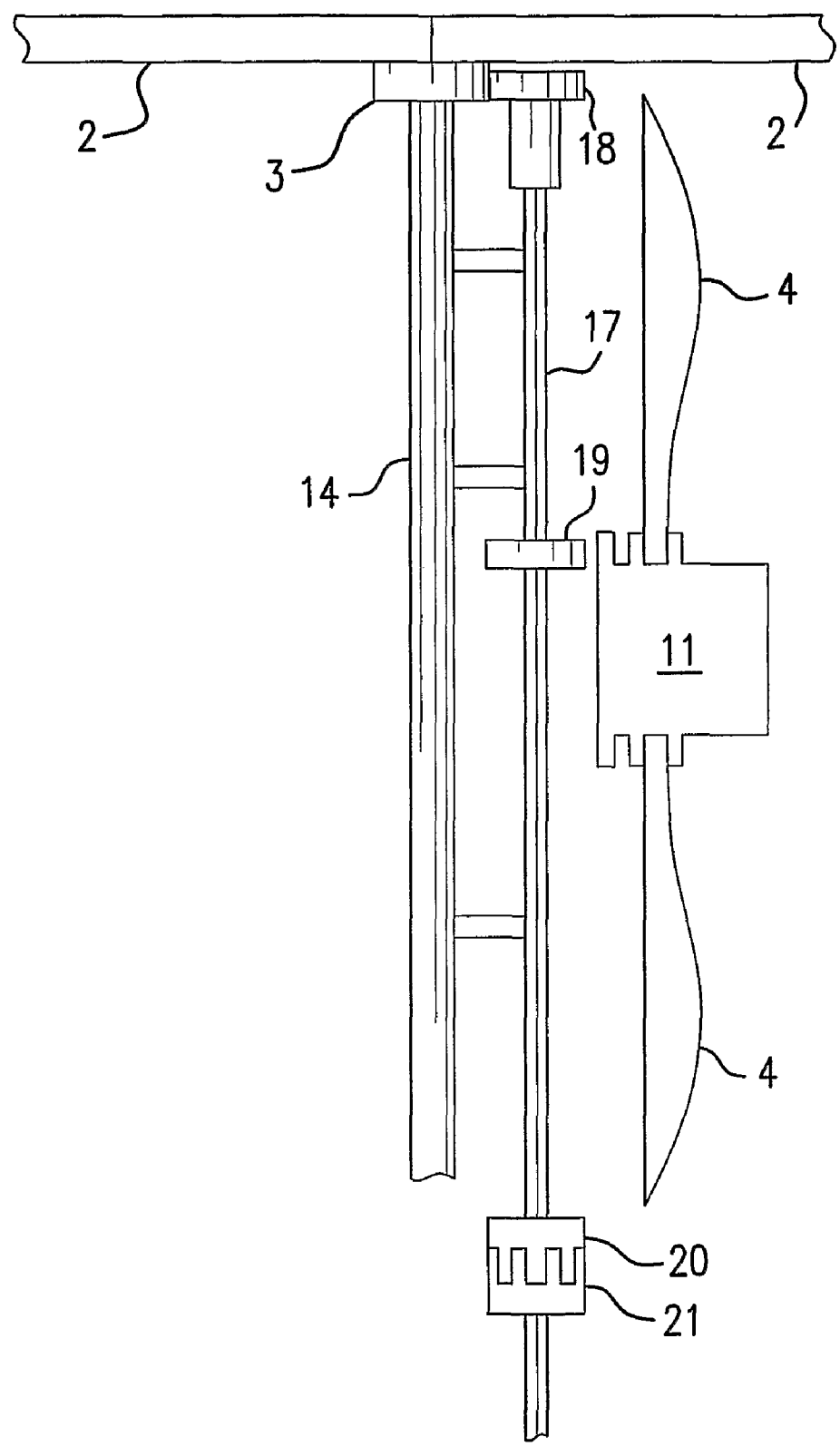
FIG. 17 is a side view of the prerotator assembly in external prerotation configuration, where the rotor is powered by an external source for a vertical take-off.

FIG. 17 is a side view of the prerotator assembly in external prerotation configuration, where the rotor is powered by an external source for a vertical take-off. Drive wheel 18, friction wheel 19, and coupling 20 are all fixedly mounted to drive wheel shaft 17. Drive wheel shaft 17 is slidably and rotatably mounted to rotor pylon 14. Rotor head 3 is rotatably mounted to rotor pylon 14. Rotor blades 2 are removably mounted to rotor head 3. Drive wheel 18 is engaged with rotor 3 and coupling 20 is engaged with external coupling 21 to power the drive wheel shaft and spin the rotor. Propeller barrel 11 is disengaged from friction wheel 19.

Figure 18:
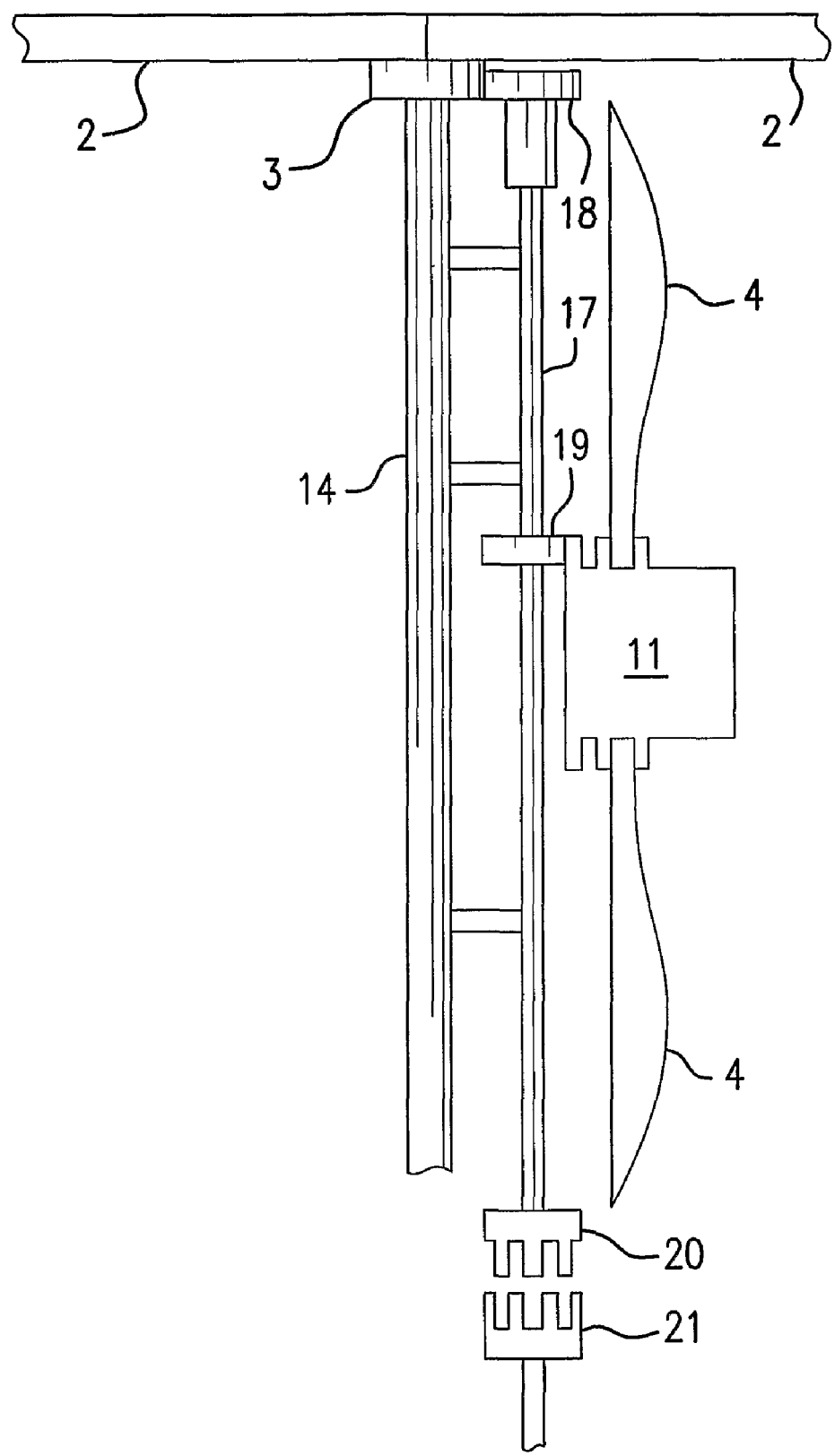
FIG. 18 is a side view of the prerotator assembly in self prerotation configuration, where the rotor is powered by the engine for a shortened take-off distance.

FIG. 18 is a side view of the prerotator assembly in self-prerotation configuration, where the rotor is powered by the engine 1 (not shown) for a shortened take-off distance. Drive wheel 18, friction wheel 19, and coupling 20 are all fixedly mounted to drive wheel shaft 17. Drive wheel shaft 17 is slidably and rotatably mounted to rotor pylon 14. Rotor head 3 is rotatably mounted to rotor pylon 14. Rotor blades 2 are removably mounted to rotor head 3. Coupling 20 is disengaged from external coupling 21. Drive wheel 18 is engaged with rotor head 3 and propeller barrel 11 is engaged with friction wheel 19 to power the drive wheel shaft and spin the rotor.

Figure 19:
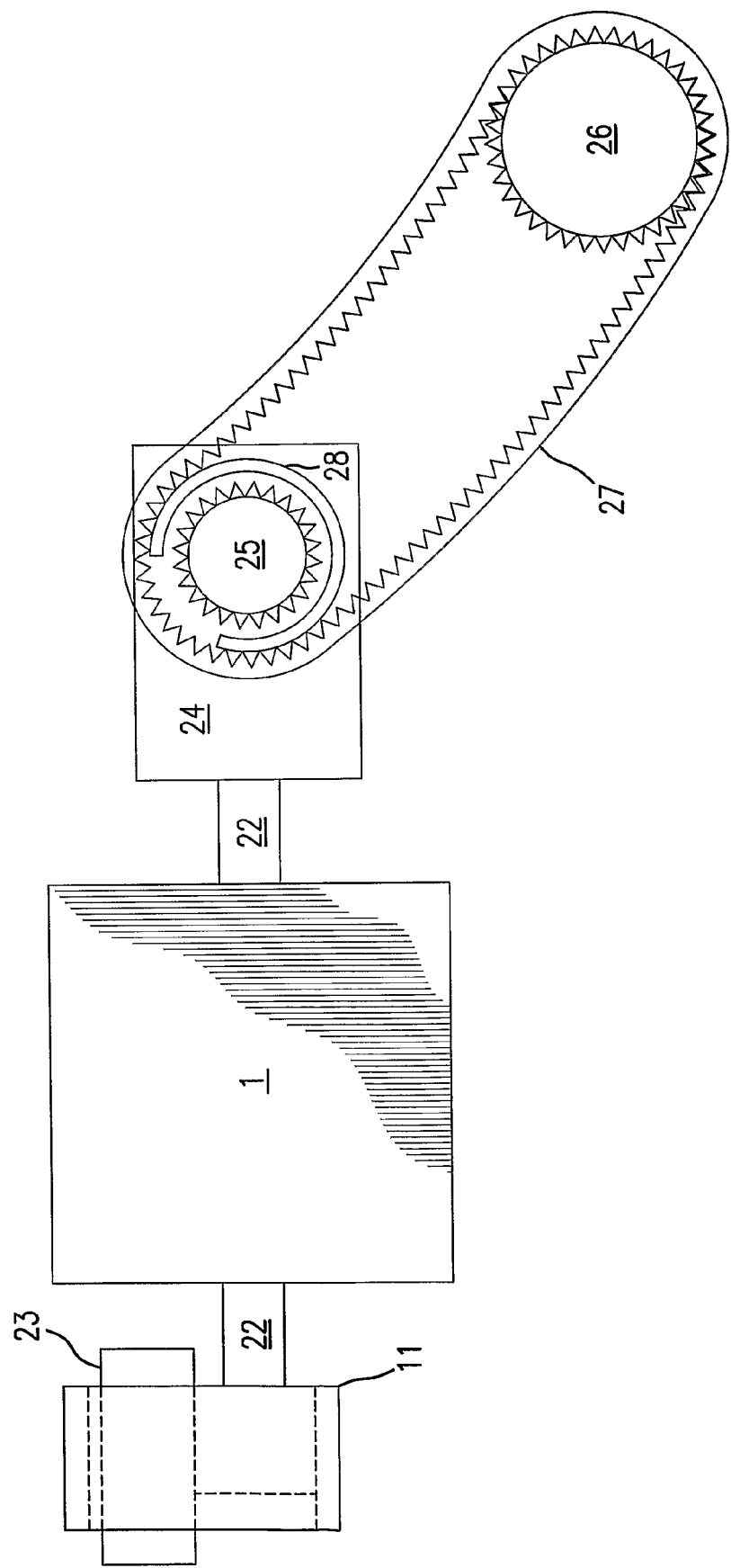
FIG. 19 is a diagram of the through propeller barrel power train in flight mode.

FIG. 19 is a diagram of the through propeller barrel power train in flight mode. Engine 1 transmits rotary power to drive shaft 22 that gearingly meshes with propeller barrel 11 when the engine is in its lowered position to transfer power to propeller 4. Cable guide 23 passes through propeller barrel 11 without making contact. The drive shaft 22 delivers rotary power to the transmission 24 that transfers power to transmission belt wheel 25. When the engine 1 is lowered, the belt 27 is slack and belt support 28 holds belt 27 disengaged from transmission belt wheel 25, so that no power is transferred to rear wheel 6. Belt 27 engages rear vehicle belt wheel 26 that is fixedly mounted on rear wheel 6 (not shown).

Figure 20:
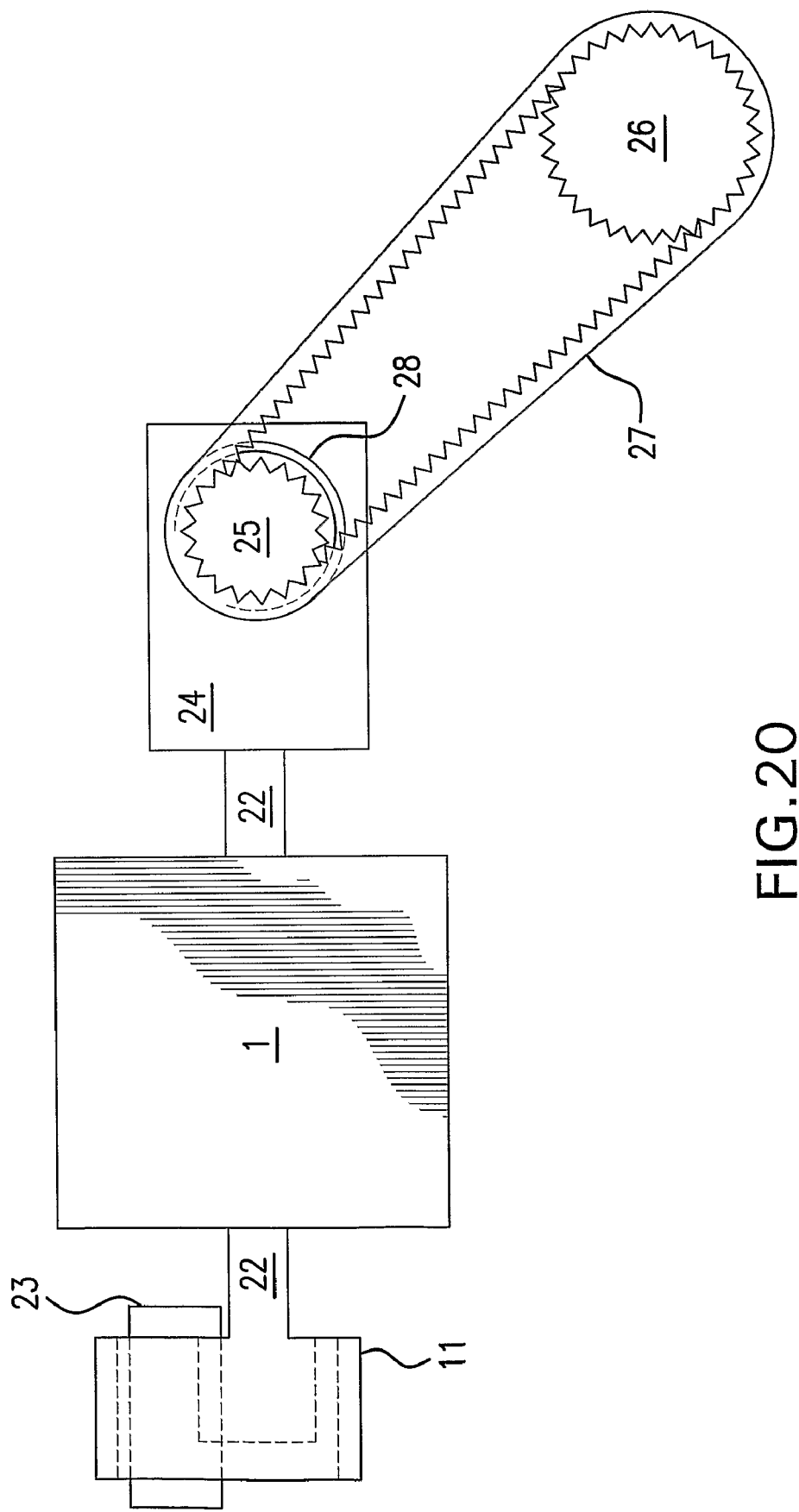
FIG. 20 is a diagram of the through propeller barrel power train in motorcycle mode.

FIG. 20 is a diagram of the through propeller barrel power train in motorcycle mode. Engine 1 transmits rotary power to drive shaft 22 that, when engine 1 is raised, is gearingly un-meshed from propeller barrel 11, so that no power is transferred to propeller 4. Cable guide 23 passes through propeller barrel 11 without making contact. The drive shaft 22 delivers rotary power to the transmission 24 that transfers power to transmission belt wheel 25. When the engine 1 is raised, the belt 27 is taught and slack belt support 28 allows belt 27 to engage transmission belt wheel 25. Belt 27 engages rear vehicle belt wheel 26 to power rear wheel 6 (not shown), to which belt wheel 26 is fixedly mounted.

Figure 21:
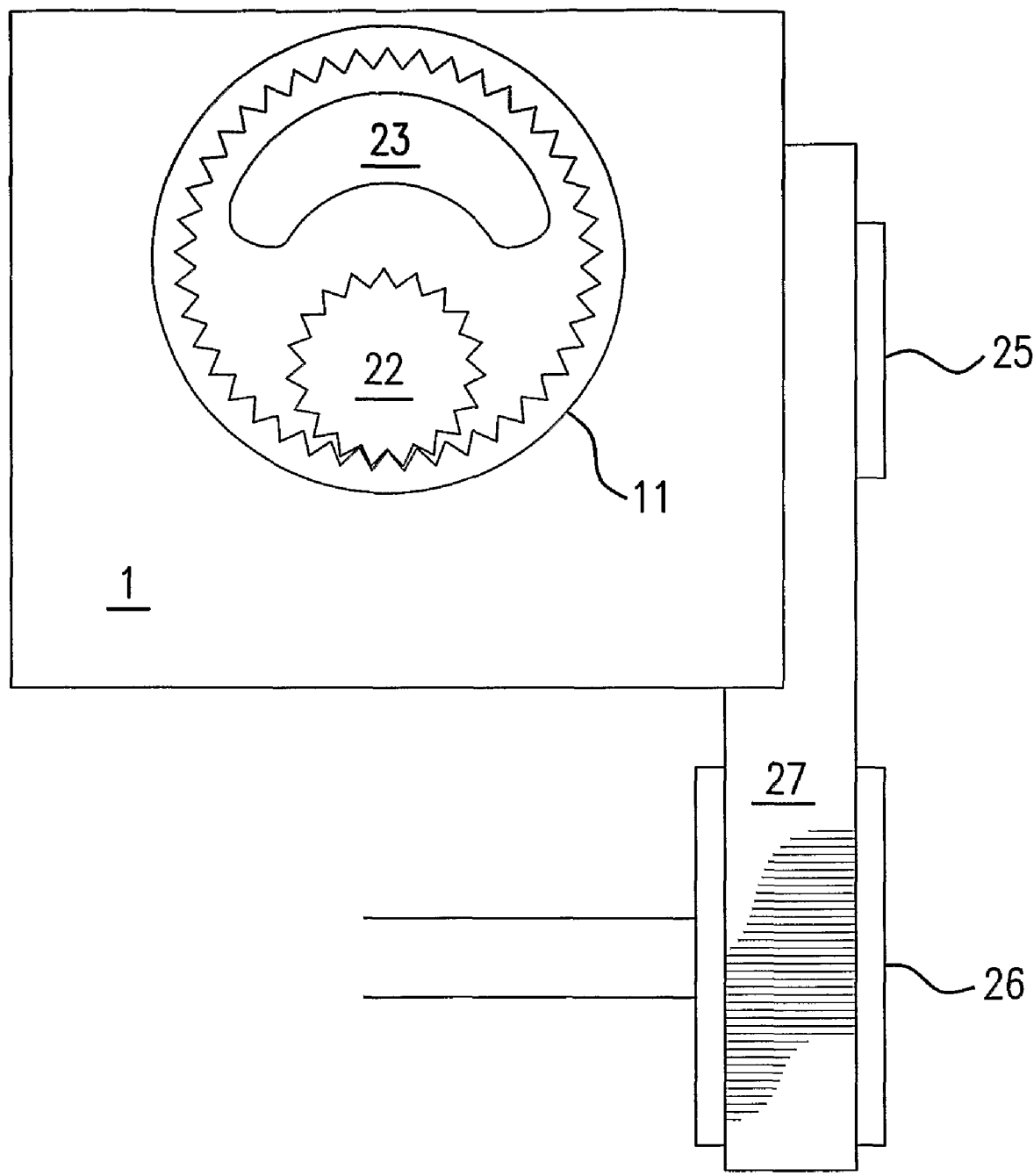
FIG. 21 is a front view diagram of the through propeller barrel power train.

FIG. 21 is a front view diagram of the through propeller barrel power train. Engine 1 transmits rotary power to drive shaft 22 that, when engaged, gearingly meshes with propeller barrel 11. Cable guide 23 passes through propeller barrel 11 without making contact. The drive shaft 22 delivers rotary power to the transmission 24 (not visible) that transfers power to transmission belt wheel 25. When the belt 27 is taught, slack belt support 28 (not visible) allows belt 27 to engage transmission belt wheel 25. Belt 27 engages rear vehicle belt wheel 26 to power rear wheel 6 (not shown).

Figure 22:
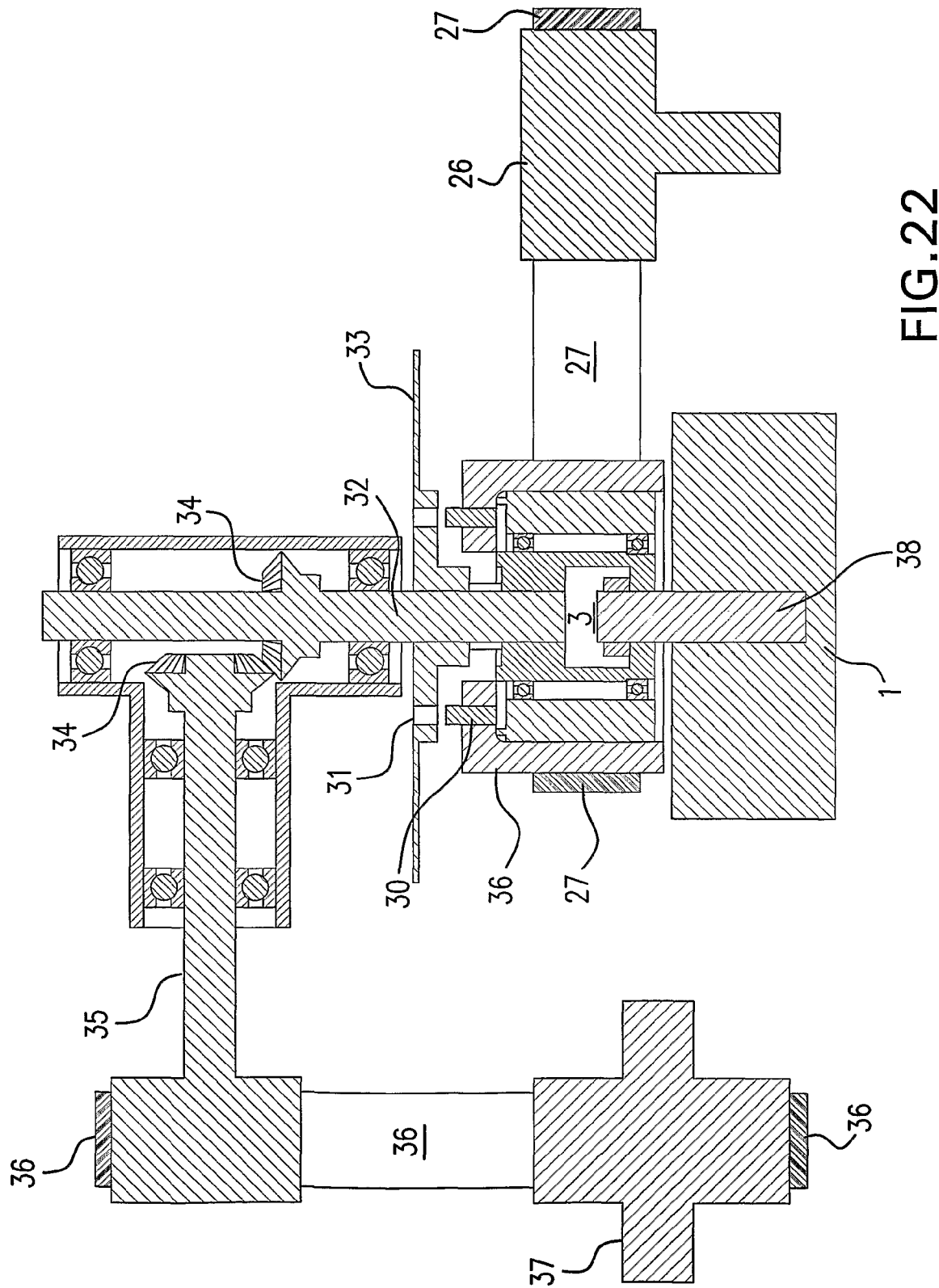
FIG. 22 is a cut-away diagram of a side mounted power train (an alternative to the through propeller barrel power train) in flight mode.

FIG. 22 is a cut-away diagram of a side mounted power train (an alternative to the through propeller barrel power train) in flight mode. Engine 1 transmits rotary power to engine shaft 38 that attaches by nut 28 to inner wheel 29. Slatted shaft 32 is slidingly connected to engine shaft 38 and angle gears 34. The engine shaft 38 delivers rotary power to the slatted shaft 32 that transmits power through engaged angle gears 34 to propeller belt shaft 35. Propeller drive shaft 35 drives propeller belt 36 that turns the propeller shaft 37. In flight mode, rear wheel 6 is not powered because, engagement pin 30 does not engage outer wheel 36 to power rear wheel drive belt 27.

Figure 23:
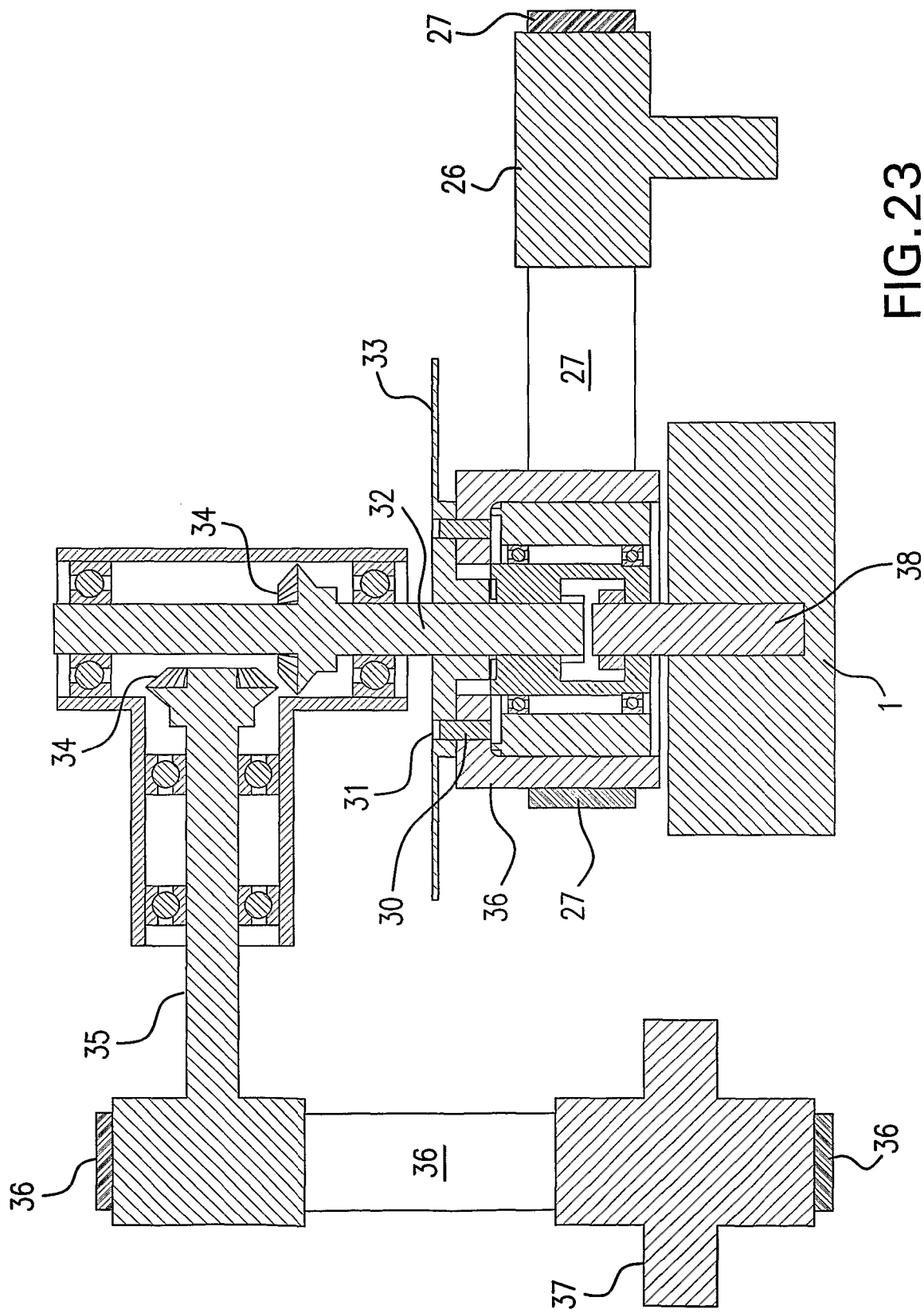
FIG. 23 is a cut-away diagram of a side mounted power train (an alternative to the through propeller barrel power train) in motorcycle mode.

FIG. 23 is a cut-away diagram of a side mounted power train (an alternative to the through propeller barrel power train) in motorcycle mode. Engine 1 transmits rotary power to engine shaft 38 that attaches by nut 28 to inner wheel 29. Slatted shaft 32 is slidingly connected to engine shaft 38 and angle gears 34. Slatted shaft 32 is fixedly joined to brake disk 33 and has engagement holes 31 that receive engagement pins 30, to engage outer wheel 36 and deliver rotary power from the engine. Power is transferred through rear wheel drive belt 27 to rear wheel shaft 26. In motorcycle mode, propeller 4 is not powered because angle gears 34 are disengaged and do not power propeller drive shaft 35.

2. Description of the Invention

As shown in FIG. 1, the present invention has a configuration similar to the Breuner Autogiro—cabin in front of a tractor type propeller and engine—with all the same advantages over other autogiros that the Breuner Autogiro enjoys, but instead of the large propeller duct and external frame supports that hold the front and back halves of the Breuner Autogiro together, the present invention uses a fuselage hub inside the propeller 4, which allows the vehicle to have a small frontal area, making the present invention suitable for road driving. The present invention has all the advantages over the Breuner autogiro that stem from being roadable—being able to travel in motorcycle mode when weather or regulations prevent flight—being able to travel in motorcycle mode to a place, often not far away, where flight is possible. In motorcycle mode, engine 1 placement behind the propeller 4 allows for seamless power transmission to the rear wheel 6. The preferred embodiment of the present invention's engine transmission is to the rear of the engine 1. This enables direct power transmission to drive the rear wheel 6 that is located behind the engine 1. The preferred embodiment of the present invention pre-rotates the rotor 2 using a simple friction wheel or gear. When this system is engaged by clutch the propeller barrel 11 can gradually drive the friction wheel 19 that in turn drives the rotor head 3 and rotor 2. The present invention's unobstructed plane of rotation for the propeller 4 allows for a lower centre of gravity when employing a similar size propeller 4 as the prior art to be mounted lower than the prior art allows while maintaining sufficient ground clearance. This results in the engine 1 being mounted in a likewise lower position and so lowers the center of gravity. A lowered propeller axis allows the vehicle to be shorter and more stable. The preferred embodiment of the present invention's free air flow around the propeller results in a much simpler and lighter structure. There is no need for obtrusive, high-drag struts to support the engine, control surfaces, or the duct that has main landing gear attached and all the heavy internal structures to withstanding landing impacts. The preferred embodiment of the present invention's engine 1 and rudders 9 and horizontal stabilizer 10 are supported through the propeller barrel. This is a much simpler, more streamlined and efficient structure that saves weight, cost, and complexity. The preferred embodiment of the present invention does not require ducting, and its support structure has a shorter stance, resulting in a smaller frontal area than the prior art. This in turn creates less drag and increased fuel efficiency when flying or driving. When flying, the Breuner Autogiro's support struts interfere with the high speed airflow of the outer regions of the propeller and induce very high drag. The preferred embodiment of the present invention's streamlined body shell 12 and propeller barrel 11 only affect the low speed airflow of the inner regions of the propeller and thus induce less drag.

A further advantage of the present invention over other autogiros that have propellers that are not at the extreme front or rear of the vehicle, is that with the engine 1, engine shell 16, and empennage 9 & 10 attached to the body shell 12 by a structural member that passes through the propeller hub 11, propeller 4 diameter can be larger because there is no clearance issue with an annular duct or other structural member connecting the front and rear parts of the vehicle. Propeller diameter is likely the most important factor in flight propulsion efficiency. The propeller 4 of the present invention has unobstructed space from the rotor blades 2 to the ground. This configuration makes it easy to make adjustments to the vehicle to accommodate a larger propeller 4 by simply extending the side wheels 5 and/or the rotor pylon 14 farther from the propeller barrel 11. Also, because the propeller 4 is located so close to the extended side wheels 5, the propeller's 4 ground clearance remains nearly constant during take-off and landing when the aircraft tilts relative to the ground. If, as in some autogiro designs, the propeller 4 were placed farther from the landing gear (side wheels 5) the risk of propeller damage due to contact with the ground increases when the aircraft tilts. Spinning the propeller 4 around the fuselage, as in the present invention, eliminates the need to raise the propeller and engine above structural members—such as a longeron keel—and has the safety advantage of keeping the center of gravity and the propeller thrust line lower, thus reducing the chance of a dangerous "power push over" flight condition in which an aircraft enters a forward roll. Another safety advantage is that placing the propeller 4 very close to the rotor pylon 14 eliminates the risk that the propeller 4 will contact the rotor blades 2 due to "rotor flap".

In motorcycle mode, compared to other roadable autogiros, the present invention has the advantages of being able to balance and lean on two wheels 6 & 7 for aggressive cornering ability with most loads passing radially up through the wheels. To get the same cornering performance, roadable autogiros with three or more wheels—which are prone to tipping over—would require heavier, laterally reinforced wheels, tires, and structures to withstand more loads perpendicular to the plane of the wheels' rotation. Compared to other motorcycles, including the Ecomobile, the present invention has the advantage of being able to fly over traffic, bodies of water, rough terrain, etc. Compared to a scooter/motorcycle attached to a parasail, the present invention can fly up to four times faster.

Although the preferred embodiment of the invention uses detachable rotor blades, foldable or retractable rotor blades are also suitable. Rotor blades could be retractable, foldable, inflatable, rolled onto a spool, or use a similar method to replace the current method of installing stowed blades from carry locations. Likewise, retractable, foldable, or detachable propeller blades will work. A self-folding/extending propeller can be used for flight such as found on the Stemme Motorglider. This relieves the pilot of the task of bolting and unbolting manually re-postitioned propeller blades to change from drive to flight mode. Although the preferred embodiment of the present invention transitions to flight mode by raising the rear wheel 6, a similar effect could be achieved by raising the front wheel 7 when the center of gravity is forward of the side wheels 5. It should also be noted that, an embodiment of the present invention could fully function in flight mode, including take-off and landing, without raising either the front wheel 7 or the rear wheel 6. It is desirable that an embodiment of the present invention achieve transition from motorcycle to flight mode and back without requiring the pilot to exit the seat, and without interrupting forward motion of the vehicle.

Here is a means for manually transitioning an embodiment of the present invention with a side-mounted power train from motorcycle to flight mode: First, the vehicle is slowed to below 10 MPH, and the side wheels 5 are extended from their retracted position by squeezing their lock pin control lever on the control stick 8 to release them, and pushing the control stick 8 forward to actuate linkage that extends the side wheels 5, which are locked into place by the spring-loaded pins. While still moving forward, the driver actuates a pair of pneumatic control valves that port compressed gas to their respective side wheel 5 pneumatic actuator assemblies, forcing the outrigger wheels outward and downward to at once lift the rear wheel 6 of the vehicle off the ground, provide clearance for the propeller 4 to be extended, and widen the stance of the side wheels 5 for greater roll stability. With the rear wheel 6 lifted off the ground, and as such, its brake rendered ineffective, the driver actuates the front handbrake lever to engage the front wheel 7 brake and bring the vehicle to a stop. At this point, the driver gets out of the seat to perform pre-flight checks and adjust the following key components for flight:

- Two safety pins are installed in each side wheel 5 to ensure they stay extended: One thru the pneumatic actuator, and one in the swivel assembly that swings the side wheel 5.
- To provide power for flight, the driver unfolds retracted propeller blades 4 by loosening bolts that hold them retracted, and extending them to be refastened by the same bolts into flight position.
- Next, to disengage the engine 1 from powering the rear wheel 6 and alternately power the propeller 4, the rear wheel brake caliper assembly is retracted from the brake disk 33, which is attached the engine angle drive's main shaft power selector/coupler disc. As shown in FIGS. 22 and 23, in motorcycle mode, engine 1 transmits rotary power to engine shaft 38 that attaches by nut 28 to inner wheel 29. Slatted shaft 32 is slidingly connected to engine shaft 38 and angle gears 34. Slatted shaft 32 is fixedly joined to brake disk 33 and has engagement holes 31 that receive engagement pins 30, to engage outer wheel 36 and deliver rotary power from the engine. Power is transferred through rear wheel drive belt 27 to rear wheel shaft 26. In motorcycle mode, propeller 4 is not powered because angle gears 34 are disengaged and do not power propeller drive shaft 35, so, with the caliper retracted, the driver loosens a locking collar on the angle gear 34 housing, allowing the slatted shaft 32 to slide in its housing until engagement pins 30 are disengaged from engagement holes 31 (so power no longer goes to rear wheel 6) and angle gears 34 are engaged (so that power now goes to propeller 4) rerouting power through propeller belt shaft 35, propeller belt 36, and propeller shaft 37, to the propeller 4. The angle drive locking collar is then retightened to secure the slatted shaft 32 in position for flight mode.
- Next, to provide control for flight, the flight control surfaces 9 and 10 must be extended from their tucked-forward motorcycle positions. Characteristic of most light aircraft, the rudders 9 are actuated by foot pedals thru control cables and housings already attached and ready to use.
- For lift, like swords from sheaths, rotor blades 2 are removed from their storage compartments and bolted to rotor hub that is attached by a teeter pin to a rotating rotor head 3 that is mounted atop a pneumatically actuated rotor pylon 14 in a retracted position. Once the blades are attached, the pneumatic cylinder is actuated—lifting the rotor blades to flight position, and a safety pin installed thru the actuator to lock it. For flight control of the rotor head assembly, control rods from the multi-function control stick to the outriggers are disconnected, and re-connected to separate linkages attached to the rotor head to transmit primary pitch and roll flight control.

The driver (the pilot), has now completed all mechanical activities to ready the vehicle for flight. Electronic selections, such as switching a GPS from road to air operations, turning on aircraft radios, anti-collision lights, and other such operational checklist items are made in the flight station prior to takeoff.

After flying, to return the vehicle to motorcycle mode, the pilot taxis to a full stop, gets out of the seat, and generally reverses the activities listed above. First, the safety pin is pulled from the rotor mast 14, and the mast retracted by opening a valve that releases gas from mast actuator. With the rotor head 3 dropped to its motorcycle mode position near eye-level, the blades 2 are removed and returned to their storage sheaths in body shell 12. Next, the engine 1 is converted back to drive mode by reversing the manipulations of the slatted shaft 32 to disconnect propeller drive power and re-select rear wheel power. The propeller 4 is returned to its stowed position by unbolting the blades 4 from extended flight mode and refastening them in retracted positions. Lastly, linkage from the control stick 8 to the rotor head 3 is disconnected and reconnected to the side wheels 5. After pulling all four safety pins from the side wheels 5, they are retracted either by gravity, or with the aid of compressed gas ported to the retracting side of the actuator. With the rear wheel 6 on the ground and side wheels 5 providing stability, the pilot (now driver) can get back in the seat, reconfigure flight station radios and lights, etc., and continue the journey.

While driving on land, the preferred embodiment of the present invention is configured and operates much as any motorcycle, with a driver balancing the vehicle on two wheels, and controlling its direction and speed with controls that closely model most rear-wheel powered production motorcycles. Control stick 8 is linked to the front wheel to steer. Typical motorcycle control devices are attached to the control stick 8, to include a twist throttle with engine on/off/start switches, a front brake lever operated by the right hand, and an engine clutch lever operated by the left hand. Side wheels 5 perform the balancing job of a rider's foot at a stoplight. A lever, operated by the left hand, is mounted to the control stick to disengage spring-loaded pins that lock pneumatic-actuator outrigger wheel assemblies into selected positions. Side wheels 5 are swung from extended to retracted positions and back by leverage from the control stick 8. Pushing the stick forward extends the outriggers for balance when static or at low speeds, and pulling the stick aft retracts the outriggers and allows the bike to make banked turns at higher speeds. This mechanical motion is transmitted to the outriggers from the control stick by control rods. As typical with most motorcycles, more controls are mounted on the frame/fuselage, to include a rear brake lever operated by the right foot, and a gear shift pedal operated by the left foot. The preferred embodiment of the present invention has controls that are very similar for both flight and motorcycle modes, and control stick 8, which controls the aircraft's pitch in flight, acts as a control—either electronic, pneumatic, manually operated lever, or other means—for articulating the side wheels 5 between retracted and extended positions on the ground. An embodiment of the present invention could be controlled completely in flight and on the ground with an electronic controller and a series of fly-by-wire servos. A hand-held video game controller or similar device could be employed. The strong advantage of this control method would be rapid familiarization with flight controls, as pilots can directly apply simulator time flying virtual aircraft accumulated on personal computers, and the rapid response psychomotor skills they develop in the process. People who fly flight simulators games far outnumber actual registered pilots, thus their skills create a large potential user base for personal aircraft.

The present invention can be made of typical aerospace materials, and special materials are not required to practice the invention. The preferred embodiment of the invention is made with very strong, lightweight materials, incorporating carbon nanotubes in the rotor blades, propellers, frame, bearing cases, and wherever else possible to reduce weight and maximize strength. It should be noted that although strength to weight ratio drives material selection in the preferred embodiment, many inexpensive materials, such as bamboo, can be substituted for many vehicle components at cost savings while retaining the general functionality of the vehicle. A nonexclusive list of possible materials includes: steel, aluminum, bamboo, spruce wood, magnesium, titanium, carbon fiber, carbon fiber nanotubes, boron, fiberglass, foam, composites made of various materials, honeycomb panels of various materials, and other common aircraft materials.

The preferred embodiment of the invention has a hybrid-drive power train for fuel efficiency, regenerative braking, and quiet operation. The present invention could also be practiced with a conventional internal combustion engine or a turbine engine. Though FIGS. 19-23 show a belt driven rear wheel 6, means to transfer power from engine 1 to said rear wheel 6, also include the following nonexclusive means: belt drive, roller chain, shaft drive to bevel gears, rim drive, and tire friction drive.

The preferred embodiment of the invention has a monocoque shell, equipped with a heater and an air-conditioner, as well as, seatbelts and airbags, but the invention could also be practiced as an open-air version without the shell, in which case helmets may be required in some jurisdictions and alternate/additional flotation means may be necessary in an amphibious model.

The preferred embodiment of the invention has a propeller, but a jet engine could also work.

The preferred embodiment of the invention is a small one or two seat vehicle, but the invention could be scaled considerably larger, as balancing on two wheels permits, to carry more passengers and cargo.

These embodiments of the invention have been described in considerable detail in order to enable one skilled in the art to practice the invention. However, the invention can be practiced with many other embodiments while still remaining within the scope of the claims.

What is claimed is:

1. A vehicle that can operate as either a motorcycle or an autogiro, said vehicle having a flight mode and a motorcycle mode, said vehicle comprising:
   a frame having a front part and a rear part;
   a center-line that passes from the front of said vehicle to the rear of said vehicle through the center of said vehicle such that said vehicle's weight is distributed nearly equally to either side of said center-line;
   at least one propeller mounted to a propeller barrel that is rotatably mounted to said vehicle's frame at the junction where said frame's front part fixedly connects to said frame's rear part;
   an engine mounted to the rear part of said frame, wherein said engine powers said propeller in said flight mode;
   a cockpit fixedly mounted to the front part of said frame, said cockpit comprising means for controlling said vehicle;
   at least one aircraft lift means comprising: at least one rotor that is rotatably mounted to said frame when said vehicle is in said flight mode;

a front wheel steerably and rotatably mounted to the front part of said frame along the said vehicle's center-line; and a rear wheel that is is rotatably mounted to the rear part of said frame along said vehicle's center-line and is powered by said engine in said motorcycle mode.

2. The vehicle as in claim 1; wherein said vehicle has side wheels retractably and rotatably mounted to said frame and said side wheels act as landing gear in said flight mode and prevent said vehicle from tipping over at low speeds in said motorcycle mode.

3. The vehicle as in claim 1; wherein:

said cockpit is enclosed in a monocoque shell that is attached to or incorporates the front part of said frame and said engine is enclosed in a monocoque shell that is attached to or incorporates the rear part of said frame.

4. The vehicle as in claim 1; wherein said vehicle is also a water craft having a water mode and a means of aquatic propulsion and one or more flotation means attached to said frame.

5. The vehicle as in claim 1; wherein said rotor comprises removable rotor blades that are stowable along the sides of said vehicle when said vehicle is not in said flight mode.

6. The vehicle as in claim 1; wherein said rotor comprises foldable rotor blades that are folded when said vehicle is not in said flight mode.

7. The vehicle as in claim 1; wherein said rotor comprises extendable rotor blades that are retracted when said vehicle is not in said flight mode.

8. The vehicle as in claim 1; wherein said propeller comprises foldable propeller blades that are folded when said vehicle is not in said flight mode.

9. The vehicle as in claim 1; wherein said engine powers said rotor to provide for shortened or vertical takeoff.

10. The vehicle as in claim 1; wherein an external power source connects to an external coupling mounted to said rotor and powers said rotor to provide for shortened or vertical takeoff.

11. The vehicle as in claim 1; wherein at least one rudder and at least one horizontal stabilizer are affixed to the rear part of said frame.

12. The vehicle as in claim 1; wherein said engine is adjustably mounted to the rear part of said frame so that said engine can be raised and lowered vertically relative to the rear part of said frame, thereby switching the supply of mechanical power back and forth from said propeller to said rear wheel by slackening and loosing one or more drive belts or meshing and unmeshing gears.

* * * * *